United States Patent
Presta et al.

(10) Patent No.: US 9,276,862 B1
(45) Date of Patent: Mar. 1, 2016

(54) TELECOMMUNICATIONS AND NETWORK TRAFFIC CONTROL AND RATE DECK SYNCHRONIZATION SYSTEM

(71) Applicant: SipNav, LLC, Las Vegas, NV (US)

(72) Inventors: Scott Presta, Trabuco Canyon, CA (US); John Oesterle, San Diego, CA (US); Kristofer W. Droge, San Diego, CA (US)

(73) Assignee: SipNav, LLC, Las Vegas, NV (US)

( * ) Notice: Subject to any disclaimer, the term of this patent is extended or adjusted under 35 U.S.C. 154(b) by 0 days.

(21) Appl. No.: 14/803,250

(22) Filed: Jul. 20, 2015

Related U.S. Application Data

(63) Continuation-in-part of application No. 14/744,025, filed on Jun. 19, 2015.

(51) Int. Cl.
*H04L 29/06* (2006.01)
*H04L 12/853* (2013.01)
*H04M 15/00* (2006.01)
*H04L 12/743* (2013.01)
*H04L 12/851* (2013.01)

(52) U.S. Cl.
CPC ........ *H04L 47/2416* (2013.01); *H04L 45/7453* (2013.01); *H04L 47/2483* (2013.01); *H04M 15/56* (2013.01); *H04M 15/8044* (2013.01)

(58) Field of Classification Search
CPC . H04L 63/1483; H04L 67/02; H04L 63/1441; H04L 51/12; H04L 29/06; H04L 29/06027; H04L 67/42; H04L 12/66; H04M 15/00; H04M 15/85; H04M 15/8044
See application file for complete search history.

(56) References Cited

U.S. PATENT DOCUMENTS

| | | | | |
|---|---|---|---|---|
| 5,881,131 A * | 3/1999 | Farris | .................. | H04L 12/2856 370/259 |
| 5,999,525 A * | 12/1999 | Krishnaswamy | ... | H04L 12/1818 370/352 |
| 6,335,927 B1 * | 1/2002 | Elliott | ..................... | H04L 12/14 370/352 |
| 6,614,781 B1 * | 9/2003 | Elliott | ................. | H04L 12/6418 370/352 |
| 2007/0140262 A1 * | 6/2007 | Wang | ................ | H04L 29/06027 370/395.52 |

* cited by examiner

*Primary Examiner* — Fan Ng
(74) *Attorney, Agent, or Firm* — Sean Casey

(57) ABSTRACT

A telecommunication and network traffic throttle and control and rate deck synchronization system including one or more processors coupled to a communications network. The system is configured to monitor, control, and throttle network traffic and to generate and synchronize rate decks to limit and block unwanted and harmful traffic to optimize performance of and protect telecommunications and network infrastructure. Received routing requests are parsed for subscriber identifiers that have assigned current rate decks. Routing requests are forwarded only for subscribers having unexpired assigned rate decks. When new assigned rate decks are generated with prospective effective times, the current date decks are modified to expire before the effective time, and subscribers are sent URLs having embedded security hashes, which must be downloaded before the current assigned rate decks expire. Routing requests cannot be forwarded upon expiration, and until subscribers download the new rate decks and an associated rate deck file hash.

30 Claims, 14 Drawing Sheets

TELECOMMUNICATIONS AND NETWORK TRAFFIC CONTROL AND RATE DECK SYNCHRONIZATION SYSTEM

CROSS-REFERENCE TO RELATED PATENT APPLICATION:

This application is a continuation of co-pending, co-owned prior filed application Ser. No. 14/744,025, filed on Jun. 19, 2015, which is incorporated by reference herein in its entirety.

TECHNOLOGICAL FIELD

The present disclosure relates generally to systems and methods for high-speed, high-volume telecommunication and network traffic routing, control, and management systems, including voice and data over internet protocol (VoIP) switches, such as class 4 hardware and software switches, which enables communication traffic between long distance carriers and competitive local exchange carriers (CLECs), private branch exchanges (PBXs), and similar class 5 internet protocol (IP) switches.

BACKGROUND

Many challenges presently exist with current systems and methods available for allocating available telecommunications and network bandwidth to users attempting to initiate voice, data, and media connections between users and subscribers. Previously, dedicated and specialized local exchange carriers (LEC) "class 5" switches were geographically located near end users or subscribers having telephones and other devices that are connected to a public telephone switched network (PTSN). Because of limited bandwidth of legacy PTSN systems, such class 5 switches used an out of band signaling system 7 (SS7) to enable setup and tear down of calls. These systems formed part of the plain old telephone system (POTS). See, for example, en.wikipedia.org/wiki/Class-5_telephone_switch.

The telecommunications call traffic from such end-user subscribers was aggregated and communicated to geographically nearby "class 4" switches, which in turn further aggregated or trunked communications traffic. See, for example, en.wikipedia.org/wiki/Class-4_telephone_switch. The dedicated class 4 switches forwarding calls between other class 4 switches, and nearby class 5 switches, and to long distance class 3 (intermediate distance), 2 (longer distance), and 1 (backbone trunks, worldwide) carriers to enable termination or completion of calls between geographically remote end-user subscribers. Such class 1, 2, 3, 4, and 5 switches and related systems were vertically and horizontally integrated and owned by just a few large companies, which limited competition and innovation, and which led to break up of the companies and deregulation.

With the deregulation of the telecommunications industry and the concurrent advent and explosive growth of competition, the internet, and internet protocol (IP) in recent decades, many new technologies arose that enabled further competition and innovation. The vertical and horizontal ownership monopoly of long distance (class 1, 2, 3) and short-haul (class 4 and 5) carrier switches and systems was broken up into many different companies.

The new companies further increased competition as they divested inefficient aspects of their businesses, and endeavored to lower costs and improve efficiency to improve profitability in the new competitive environment. The long distance carriers saw the previous technical delineation between class 1, 2, and 3 carriers vanish as the technology that enabled long distance dedicated-voice telecommunications matured and merged to also enable long distance communications and IP network data and media communications traffic.

The new companies, then known as competitive LECs or CLECs, also further specialized into providing new capabilities in the class 5 and class 4 switch and systems technology areas. For example, class 5 providers developed new customer premises voice and data systems, which were compatible for use with internal customer IP and communications networks, which evolved from older wired private branch exchange systems (PBXs) into voice and data over IP or VoIP systems and VoIP PBXs, which could bypass legacy class 5, SS7 out-of-band wired switches, and use less expensive and more readily available IP internet connections to the outside world. The ubiquity of the internet has brought enhancements to legacy systems such as SS7, which has been upgraded in some places to use the internet, for example, such as SS7/IP switches.

Other parallel developments arose for local exchange class 4 switch providers who also moved away from dedicated and wired connections to legacy class 5 switches. Instead, by integrating compatibility with the communications and IP network, geographic proximity was no longer required so long as internet services were available between the target class 5 customer or subscriber, and class 4 provider or carrier. Additionally, competition continued to drive innovations as the technology that enabled class 4 and class 5 telecommunications switching overlapped with that for internet communications. Consequently, class 4 switching system providers or carriers were able to serve and connect customers or subscribers with carriers across any geographic distance.

As digital communications systems replaced older analog capabilities, the technical distinction between voice and other types of data matured into standards that decoupled the enabling hardware systems from the software technologies. More specifically, the enabling telecommunications hardware technologies evolved into standards and capabilities that were focused on communicating large volumes of high-speed telecommunications traffic without regard for the data content (voice, data, media) of the traffic.

Competitive business entities and research organizations developed an open system interconnection (OSI) seven layer model that describes the conceptual or logical architecture of the various elements of such communications systems. See, for example, http://en.wikipedia.org/wiki/OSI_model. Some technologists prefer a lower resolution model broadly describing such telecommunications systems as having four layers that include a physical and data link layer, a network and transport layer, and an application layer. Such various system models are compatible with one another, and are valuable tools for improving understanding and opportunities for interoperability. In any variation of the OSI model, there are two broad categories, a lower level physical network layer, and data communications layers termed the "media layer", and a higher level communications layer containing the transport, session, presentation, and application layers that are also in aggregate termed the "host layer".

With increased interoperability, compatibility, and unlimited access between CLECs, class 4 carriers, and long-distance carriers, many new challenges and problems have become apparent. For example, marketers, debt collectors, and similar businesses have sought to reach more targets using telecommunications and network infrastructure by using auto dialing and automated contact management and voice messaging systems.

These systems often are configured with many types of multi-line systems that can auto-dial dozens, hundreds, and more destination telephone numbers rapidly and or simultaneously, which can inundate infrastructure with call routing requests. Often, such call routing requests also cannot be completed because the requests seek termination to destinations that are erroneous and have changed, do not exist, and which are out of service and or cannot otherwise be reached.

So while the telecommunications and network infrastructure attempts to accept such call routing requests, and to complete the call by attempting to reach such unreachable destinations, the infrastructure cannot be utilized by nominal traffic from routine callers to reachable destinations. This results in overwhelmed but underutilized infrastructure that is being inefficiently consumed by problematic traffic from subscribers and users that will never complete a call, and which will never be billed for infrastructure usage.

To compound the problem, such users that inject problematic traffic into the telecommunications systems, are not billed for incomplete calls even though the infrastructure is operating at capacity. This introduces seemingly insurmountable problems even for the highest-speed and highest-volume hardware and software class 4 switching systems. Further adding to this challenge, the quality of service for otherwise nominal users and customers can sometimes be drastically degraded during normal operation in that such nominal users and customers are confronted with service-unavailable and all-circuits-busy messages.

Despite the rapid advances in ever more powerful, high-speed and high-volume telecommunications and network infrastructure, such infrastructure for any particular class 4 tandem exchange or carrier, as well as for long distance class 1, 2, and 3 carriers, remains limited in bandwidth for the total number of calls per second (CPS) and concurrent sessions (CS) that can be accommodated and allocated, to enable call routing and forwarding for customers and subscribers.

Typically, most such class 4 tandem exchange or carrier infrastructure can be and is configured to limit the CPS and CS for any particular subscriber or customer, which limits ensure the availability of bandwidth for the expected traffic of subscribers nominally making and completing calls, and according to the configured capacity of the infrastructure. Additionally, telecommunications technologists usually understand that the infrastructure required to enable providers and carriers to carry communications traffic is expensive to implement, and that it takes time to build out networks for the providers and carriers.

Consequently, the network communications marketplace is supply side limited, which forces providers and carriers to impose the CPS and CS limitations so that many demand side users, customers, and subscribers may utilize some bandwidth on the communications traffic networks. Unlike other commodities where supply can be increased through increased production, once installed and operational, the supply side communications networks cannot easily and rapidly increase bandwidth.

Therefore, the demand side customers and subscribers have struggled to find new ways to optimize utilization of the limited CPS and CS bandwidth so that only the most desired, highest quality traffic is switched or passed onto the limited bandwidth, supply-side carrier communications networks. In the past, some telecommunications providers and carriers have attempted to limit the available CPS and CS bandwidth by imposing a minimum cost and or profit limit to customer and subscriber traffic. However, such demand side cost controls have had limit beneficial effects.

Class 5 CLECs, class 4 tandem exchange and switch providers, and long-distance class 1, 2, and 3 carriers all seek to eliminate, control, throttle, and otherwise limit problematic traffic, and to allocate limited bandwidth resources to the traffic that is most likely to utilize and pay for the use of the infrastructure. At present, the most common methods employed by various systems impose the above-noted CPS and CS limits, which does not solve the need to identify and limit only problematic traffic, but which attempts to enable communication of desirable traffic.

Such problematic traffic can be difficult to limit when call routing requests are received from otherwise preferable LEC and CLEC subscribers and customers who may be forwarding the problematic autodialer traffic unintentionally. Additional challenges arise when such problematic traffic seeks to reach destination numbers that have been ported from their original exchanges to new exchanges, wherein the original numbering plan area (NPA) and local number prefix (NXX) are different for the new exchange.

Organizations in many countries, including the US Federal Communications Commission (FCC) (fcc.gov) and US Number Portability Administration Center (napc.com), maintain, and have in-part delegated responsibility to maintain, current information about telephone numbers and telephone exchanges for all land-line and wireless users, which enables telecommunications providers to determine whether a land-line, wireless, or soft telephone user has changed telephone carriers and exchanges. These organizations support maintenance of number portability administration (NPA) databases that record the current exchange and telephone information for all end users, which enables users to change their service providers. The series of databases are known as the local number portability (LNP) databases for land-line users, and the full or wireless number portability (FLNP, WLNP) databases for wireless users.

These obstacles can be difficult to surmount when traffic volumes can exceed hundreds, thousands, or tens of thousands of call routing requests per second or more, which can require tens of thousands of simultaneous and concurrent call sessions or more, to enable termination or disposition of the call routing requests. Such obstacles are even more pronounced in view of the more than 200,000 possible NPA/NXX routes, in the North American region alone, which each will have multiple costs and call routing rates that can be incurred to efficiently allocate and utilize infrastructure and switching systems to route calls, and to limited traffic that should not be using the call routing infrastructure.

The challenges and obstacles are further amplified when combined with the nearly 10,000 possible destination numbers for each of the NPA/NXX routes, and the thousands of customer, subscriber, vendor, and carrier entities and organizations that own, manage, maintain, access, and enable use of aggregated and collaborating telecommunications infrastructure, systems, and services.

Further obstacles have arisen in enabling the efficient routing of call routing requests and utilization of the enabling switching infrastructure, when call routing requests are received by a switch provider, vendor, or carrier that has updated one or more call routing costs in one or more of its rate decks. Typically, in the past, CLECs will engage in a relationship with many carriers to enable CLEC customer call routing requests to be terminated to a destination number.

As should be well-known by those active in the industry, class 5 CLECs and class 1, 2, 3, and 4 switching vendors or carriers are continuously changing: companies are being bought, sold, and merged. Such entities are also continuously changing their infrastructure, capabilities, and services.

CLEC and carrier companies never rest in their focus on upgrading capabilities and networks, terminating inefficient operations, expanding operations and networks, and bringing online new capabilities, networks, and innovative operations. As changes occur, such companies must concurrently assess their costs and must in turn establish new, higher or lower rates for use of their physical infrastructure and systems.

These CLEC and carrier companies have many arrangements that enable them to continue efficient and competitive operations, but nearly all such entities maintain what known in the industry as rate decks. Each customer, subscriber, vendor, carrier, and related companies and entities typically maintain any number of rate decks for use in costing various classes of telecommunications services and for types of communications traffic, such as voice calls, data, facsimile, call center PBX call, autodialer traffic for mass audio message dissemination, and the like. Such rate decks are exchanged between partnering companies and entities so that each knows what it will cost to use the infrastructure and services of another.

Such rate decks typically include at least two tiers of cost information or more, such as a local area route cost, an out of area route cost, and a cost for indeterminate or hybrid area route cost, and others. For example, in the North American region, local area costs could be for instate or intrastate call routing between cities, and out of area costs could be for interstate, cross border, or out of state calls.

Each such in area and out of area cost is associated with a specific NPA/NXX destination. Typically, such rate decks will include a route cost for each NPA/NXX destination and have different costs for local/intrastate and long-distance/interstate call routes, as well as a cost for indeterminate or hybrid routes.

These costs will be included in the rate decks for each NPA/NXX served by the associated customer, subscriber, and or carrier. While the rate decks may be limited to a few hundred local area NPA/NXXs, some rate decks for larger carriers and aggregators may for example without limitation include all North American NPA/NXXs, which number over 202,000 NPA/NXXs. Rate decks for international call route costs are similarly arranged, and the number of international destinations are even higher, adding even more complexity to the systems.

For example, if a customer or subscriber wants to initiate a call request, the customer or subscriber first checks its rate decks that were obtained from its partnering vendors or carriers, to determine if their partnering vendors or carriers list an NPA/NXX that describes the cost to terminate the request to the specific NPA/NXX destination, at route cost that is acceptable to the customer/subscriber. When rate decks change but the changes are not known to these partners, call routing requests may be initiated and completed, but the true costs are not known in advance to the call requestor or initiator.

Consequently, inefficient use of infrastructure results because, among other challenges, actual costs for infrastructure utilization are different than expected. Calls may be inadvertently routed to inefficient or high-cost infrastructure, which causes more efficient and lower cost infrastructure to be underutilized. Such cost differences are often discovered long after the calls are completed, and during subsequent billing cycle settlement activities wherein the customer or subscriber receives bills that are higher than expected. In some circumstances, such cost differentials are discovered as a result of interrupted, suspended, and or cancelled call routing services and or refused access to carrier switches and infrastructure, which causes underutilization and suboptimal resource allocation.

For example, assume customers and subscribers having a class 5 switch or similar equipment have agreed to forward call routing requests from their end users to specific class 4 switch suppliers or vendors (as well as perhaps directly to class 1, 2, and 3 switch vendors and suppliers). Each vendor and supplier will establish a contractual relationship, and will then provide each of the customers and subscribers with call routing rate decks, each for a particular class of service. Such rate decks are used by the customers and subscribers to then establish cost bases for each of their end users.

It often occurs that as vendors and carriers update their rates, they will communicate new rate decks to their customers and subscribers, usually by electronic mail. The customers and subscribers sometimes do not receive the new rate decks. Other times the rate decks may be received, but go unnoticed.

In still other circumstances, the new rate decks are received and noticed by the recipient customers and subscribers, but may not be correctly assimilated into the switches and systems of the recipient customers and subscribers, such that their cost expectations and accounting will not be accurate when they receive their periodic billing from the carriers and subscribers. As noted, such problems lead to service interruptions, disconnections, disputes, and myriad other inefficient underutilizations of telecommunications and switching resources and infrastructure, and the undesirable and unknowing use of inefficient, high-cost infrastructure.

What is needed is a new system and method for rapidly identifying and controlling, blocking, limiting, and throttling such problematic traffic or low quality traffic, and to ensure infrastructure resources and bandwidth are conserved and available to maintain service for high quality, preferred traffic. Also needed is a way to enable fast and efficient identification of specific call routing requests that enables limiting or blocking problematic traffic with a resolution to those specific, low quality call routing requests, while simultaneously enabling communication of higher quality traffic.

It is also needed to enable automated control of such specific, low quality traffic for a period of time so that such low quality traffic from identified sources does not consume infrastructure resources while such control persists. It is desirable to further enable such systems and methods to also rapidly identify problematic traffic from call routing requests that originate from specific sources and or that seek termination to unreachable destinations. Currently, no adequate solutions exist to also establish the capability to identify problematic or low quality traffic using any number of predetermined criteria, which can include one or a number of traffic characteristics.

Additionally, customers, subscribers, vendors, and carriers would all benefit from a new capability that will enable efficient, uninterrupted, authenticated, and verifiable maintenance, distribution, and integration of NPA/NXX routing rate deck route cost changes. What has been needed and long unavailable is a system that not only enables improved accuracy when updating such routing costs, but which also overcomes the many challenges associated with manual and email-based rate deck update distribution.

A system is also needed that enables more accurate and automated distribution of verifiably accurate routing cost rate decks would enable far more efficient utilization of telecommunications resources and infrastructure without the previously undesirable service interruptions, unexpected costs, and time-consuming and tedious accounting disputes between customers, subscribers, vendors, and carriers, which consumes valuable but limited time and resources that can be better expended on maintaining and improving telecommunications networks, infrastructure, operations, and related resources.

An improved solution that enables these previously unavailable capabilities is described herein. The innovative solutions include a telecommunication and network traffic control system and related methods that are configured to monitor, control, and throttle network traffic to limit and block problematic, unwanted, and harmful traffic, and which also enable verifiable, accurate, and authenticated update, management, and distribution of ever changing call routing rate deck cost arrays and information. These new systems and methods are adapted to better optimize performance of and to protect telecommunications and network infrastructure from being consumed by such sub-optimal traffic, which results in vastly improved and more efficient utilization of limited telecommunications infrastructure and systems.

BRIEF SUMMARY

The systems and methods include new capabilities to enable telecommunication and network traffic control systems to optimize performance of and protect telecommunications and network infrastructure, including communications lines, trunks, switches, switch fabric, routers, gateways, controllers, border controllers, and related equipment and devices. The systems and methods enable greatly improved monitoring, control, and throttling of large volumes of high-speed network traffic to limit and block unwanted and harmful traffic, which enables infrastructure utilization for desirable, preferred, and intended network traffic. See, e.g., sipnavigator-com.

The new methods and systems include one or more processors, computers, virtual machines, and similar devices being configured with memory and storage and being coupled to a switch fabric in communication with an internet protocol (IP) network. Call routing requests are received by the one or more processors, which parse the routing requests to generate and communicate source automatic number identifications (ANIs) and destination telephone numbers (DNs or TNs).

The DNs are used to "dip" or make inquiries to routing databases, which enable generation of local routing numbers (LRNs) for DNs that may have been ported to a new exchange carrier from an original carrier. For DNs that have not been ported, the LRNs may be null, or may be identical or similar to the original DNs.

The systems and methods continuously accumulate, evaluate, and monitor the ANIs and LRNs over time periods, and identify possibly low quality call routing request attempts that have source ANIs and destination DNs exceeding a predetermined number of attempts. When such ANIs and LRNs are identified or detected, the systems and methods are configured to throttle, limit, and or block those call routing requests having ANIs and or LRNs that also have non-preferred characteristics.

Such non-preferred characteristics can include, for example, traffic quality of service parameters, limits, and ranges that do not meet or that are outside of predetermined settings and requirements, which settings and requirements determine efficient, optimized, preferred operations of the telecommunications and network infrastructure.

To protect the infrastructure, the systems and methods control, throttle, limit, and block the telecommunications and network traffic bandwidth that is allocated to call routing requests. The bandwidth allocations may range between zero bandwidth, for blocked call routing requests, or bandwidth established by preset or varying communications rates and volumes. The novel methods and systems may block, limit, throttle, and optimize such telecommunications and network traffic for durations ranging from short durations of seconds, minutes, and hours, to days, and longer, and may permanently effect such bandwidth controls.

In one exemplary configuration, the systems include a telephony network traffic throttle, having at least one processor that is coupled to a memory and a switch fabric. The throttle is configured to receive call routing requests via the switch fabric and to parse and communicate automatic number identifications (ANIs) from the routing requests. An ANI limiter is coupled to the at least one processor, and is configured to evaluate accumulated ANIs for a predetermined period of time and to identify those call routing requests, which have accumulated ANIs exceeding a call attempt limit during the predetermined period of time.

The ANI limiter is also configured to generate one or more ANI timed locks for the identified call routing requests, which have ANIs also meeting one or more predetermined ANI criteria. These one or more predetermined ANI criteria may include any number of communications traffic performance, quality, and cost parameters. For example, the ANI limiter can be configured to generate the one or more ANI timed locks for those ANIs having one or more of (a) an ANI short duration percentage (SDP) above an ANI SDP limit, (b) an ANI answer seizure ratio (ASR) below an ANI ASR limit, and (c) an ANI average call duration (ACD) below an ANI ACD limit, wherein criteria (a), (b), and (c) are some of the one or more predetermined ANI criteria.

The ANI limiter can also be configured to generate one or more of the ANI timed locks to have one or more ANIs and associated expiration times. Once generated, the at least one processor is further configured to communicate a service-unavailable reply to routing requests having unexpired ANI timed locks, and to forward routing requests having expired ANI timed locks or not having ANI timed locks.

In some configurations, the routing requests are and or may include session initiation protocol (SIP) requests, and the at least one processor is configured communicate a 503 service-unavailable SIP reply to such SIP requests that have unexpired ANI timed locks, and to forward SIP requests having expired or not having ANI timed locks.

Any of the preceding arrangements may also include at least one least cost router (LCR) in communication with a dynamic routing database, which is configured to receive the forwarded routing requests. Such forwarded routing requests also may each include a destination number. The at least one LCR router is configured to dip the dynamic routing database to generate a local routing number (LRN) associated with the destination number. One or more LCR logic mappers are coupled to the at least one LCR router, and are configured with a plurality of dynamically updated subscriber and carrier rate decks. The rate decks each have a plurality of rates for respective numbering plan areas/local number prefixes (NPAs NXXs).

The LCR logic mappers are configured to: (a) map a destination NPA NXX from the LRN, (b) scan the pluralities of rates for each of the subscriber and carrier rate decks of the plurality, using the mapped destination NPA NXX to identify available carriers, and (c) generate with the scan an LCR matrix for the destination NPA NXX including associated subscriber and carrier NPA NXX rates. The LCR router receives the LCR matrix and determines whether one or more acceptable carrier routes exist that enable forwarding of the routing request.

The one or more acceptable carrier routes may then be further filtered to include only those routes wherein the pluralities of rates in the LCR matrix generate greater than or equal to a minimum subscriber and or carrier gross profit amount per unit of time. In a variation, the one or more acceptable carrier routes are filtered, (a) by comparing in real-time with the routing requests the dynamically updated pluralities of subscriber and carrier NPA NXX rates, (b) to include only those routes wherein the pluralities of rates in the LCR matrix generate greater than or equal to a minimum subscriber and or carrier gross profit amount per unit of time.

In a different configuration, a telephony network traffic throttle includes at least one processor coupled to a memory and in communication with a routing database, which is configured to receive call routing requests and to parse and communicate destination numbers (DNs) from the routing requests. The at least one processor is also configured to use the DNs to dip the routing database to generate a local routing number (LRN) associated with each DN.

An LRN limiter is also coupled to the at least one processor, and is configured to evaluate accumulated LRNs for a predetermined period of time and to identify routing requests having accumulated LRNs that exceed a destination attempt limit during the predetermined period of time. The LRN limiter is also further configured to generate one or more LRN timed locks for the identified routing requests having LRNs that also meet one or more predetermined LRN criteria.

The LRN limiter is configured to generate the one or more LRN timed locks for those LRNs having one or more of (a) an LRN short duration percentage (SDP) above an LRN SDP limit, (b) an LRN answer seizure ratio (ASR) below an LRN ASR limit, and (c) an LRN average call duration (ACD) below an LRN ACD limit, wherein criteria (a), (b), and (c) are some of the one or more predetermined LRN criteria. The LRN limiter is also configured to generate one or more of the LRN timed locks to have one or more DNs, and associated LRNs and expiration times.

The at least one processor is also configured to communicate a service-unavailable reply to routing requests having unexpired LRN timed locks, and to forward routing requests having expired LRN timed locks or not having LRN timed locks. In some alternative arrangements, the routing requests are and or may include session initiation protocol (SIP) requests, and the at least one processor is configured communicate a 503 service-unavailable SIP reply to the SIP requests having unexpired LRN timed locks, and to forward SIP requests having expired or not having LRN timed locks.

In communication with one or more of the at least one processor is at least one least cost router (LCR router) coupled with a routing database, and configured to receive the forwarded routing requests and associated LRNs. The at least one LCR router is coupled to one or more LCR logic mappers, which are configured with a plurality of dynamically updated subscriber and carrier rate decks. The rate decks each having a plurality of rates for respective numbering plan areas/local number prefixes (NPAs NXXs).

The LCR logic mappers are configured to: (a) map a destination NPA NXX from the LRN, (b) scan the pluralities of rates for each of the subscriber and carrier dynamically updated rate decks of the plurality, using the mapped destination NPA NXX to identify available carriers, and (c) generate with the scan an LCR matrix for the destination NPA NXX including associated subscriber and carrier NPA NXX rates. The LCR router receives the LCR matrix and determines whether one or more acceptable carrier routes exist that enable forwarding of the routing request.

When desired, the acceptable carrier routes are filtered to include only those routes wherein the pluralities of rates in the LCR matrix generate greater than or equal to a minimum subscriber and or carrier gross profit amount per unit of time. The one or more acceptable carrier routes are filtered, (a) by comparing in real-time with the routing requests, the dynamically updated pluralities of subscriber and carrier NPA NXX rates, and (b) to include only those routes wherein the pluralities of rates in the LCR matrix generate greater than or equal to a minimum subscriber and or carrier gross profit amount per unit of time.

In additional arrangements, a method of throttling telephony network traffic includes providing at least one processor having a memory and in communication with an inbound switch fabric and an external network. The at least one processor is configured for parsing automatic number identifications (ANIs) from routing requests received from the external network, and for evaluating accumulated ANIs for a predetermined period of time.

The method of throttling telephony network traffic also includes identifying routing requests having accumulated ANIs that exceed a call attempt limit during the predetermined period of time. Next, generating for the identified routing requests is accomplished for one or more ANI timed locks for those ANIs that also meet one or more predetermined ANI criteria.

The generating step may also include generating the one or more ANI timed locks, to have one or more ANIs and associated expiration times, and for those ANIs having one or more of (a) an ANI short duration percentage (SDP) above an ANI SDP limit, (b) an ANI answer seizure ratio (ASR) below an ANI ASR limit, and (c) an ANI average call duration (ACD) below an ANI ACD limit, which are some of the one or more predetermined ANI criteria. Generating the one or more ANI timed locks to have one or more ANIs also may include generating associated expiration times.

The method of throttling telephony network traffic can be further configured for communicating a service-unavailable reply to routing requests having unexpired ANI timed locks, and for forwarding routing requests having expired or not having ANI timed locks. Further, the routing requests can be session initiation protocol (SIP) requests, wherein the communicating step includes communicating a 503 service-unavailable SIP reply to SIP requests having unexpired ANI timed locks, but forwarding SIP requests having expired or not having ANI timed locks.

The throttling method also includes receiving the forwarded routing requests that also each include a destination number, generating a local routing number (LRN) associated with the destination number by using the destination number to dip a routing database. Next, mapping a destination NPA NXX from the LRN is performed.

One or more LCR logic mappers is provided, which are configured with a plurality of dynamically updated subscriber and carrier rate decks each having a plurality of rates for respective numbering plan areas/local number prefixes (NPAs NXXs). The method is also adapted for scanning the pluralities of rates for each of the subscriber and carrier rate decks of the plurality using the mapped destination NPA NXX, and generating with the scanning an LCR matrix for the destination NPA NXX including carriers and associated NPA NXX rates. Then a step is executed of determining whether the LCR matrix includes one or more acceptable carrier routes exist that enable forwarding of the routing requests.

Filtering the acceptable carrier routes is accomplished to include only those routes wherein the pluralities of rates in the LCR matrix generate greater than or equal to a minimum subscriber and or carrier gross profit amount per unit time. Additionally, this step may be augmented for filtering the acceptable carrier routes (a) by comparing in real-time with the routing requests the dynamically updated pluralities of subscriber and carrier NPA NXX rates, (b) to include only those routes wherein the pluralities of rates in the LCR matrix generate greater than or equal to a minimum subscriber and or carrier gross profit amount per unit time.

In another configuration, a method of throttling telephony network traffic, includes providing at least one processor having a memory and in communication with an inbound switch fabric and an external network. The method is also adapted for parsing by the at least one processor, destination numbers (DNs) from routing requests received from the external network. The method is next configured for generating a local routing number (LRN) associated with each DN by dipping a routing database with the destination numbers.

The throttling method is then enabled for evaluating accumulated LRNs for a predetermined period of time, and for identifying routing requests having accumulated LRNs that exceed a destination attempt limit during the predetermined period of time, and for generating for the identified routing requests, one or more LRN timed locks having LRNs that also meet one or more predetermined LRN criteria.

The method for throttling telephony network traffic may also be configured for generating the one or more LRN timed locks, to have one or more DNs and associated LRNs and expiration times, and for those LRNs having one or more of: (a) an LRN short duration percentage (SDP) above an LRN SDP limit, (b) an LRN answer seizure ratio (ASR) below an LRN ASR limit, and (c) an LRN average call duration (ACD) below an LRN ACD limit, which are some of the one or more predetermined LRN criteria.

In other variations, the method is adapted for generating the one or more LRN timed locks to have one or more DNs, and associated LRNs and expiration times. If preferred, the method also is enabled for communicating a service-unavailable reply to routing requests having unexpired LRN timed locks, and for forwarding routing requests having expired or not having LRN timed locks.

In some configurations, the method receives routing requests that are session initiation protocol (SIP) requests, and is configured for communicating a 503 service-unavailable SIP reply to SIP requests having unexpired LRN timed locks, and then for forwarding SIP requests having expired or not having LRN timed locks. In any of the preceding method parts, the method of throttling telephony network traffic is adapted for receiving the forwarded routing requests and associated LRNs, and for providing one or more LCR logic mappers, which are configured as already described.

In additional arrangements, the telephony network traffic throttle also incorporates and or is configured also as a rate deck synchronization system, which is coupled to and in communication with the various preceding components and systems described elsewhere herein. The throttle and rate deck synchronization system also includes one or more and at least one processor that is coupled to, among other components, a memory, and which are in communication with rate deck and subscriber repositories.

A rate deck generator is also coupled to and in communication with these components and the processor of the throttle and synchronization system, and is configured to modify current rate decks and to generate new rate decks. The rate decks for any particular class of service, include data that defines the cost per unit time for routing calls, data, and other types of communications traffic, to destination numbers, via the customer and/or carrier to which the respective rate deck is assigned. The rate decks typically will also include an effective time and an expiration time. The effective times are dates and times when the current or generated rate deck becomes effective for use in determining the cost for routing calls by the assigned or associated customer, subscriber, and/or carrier. When the expiration time arrives, these rate decks become obsolete and superseded by newer rate decks, and may no longer be used to determine costs.

A hash generator is also in communication with the rate deck generator and configured to generate, and store in either or both the rate deck and subscriber repositories, a unique rate deck file security hash. The rate deck generator is also configured to identify in the subscriber repository, those subscribers that have an assigned current rate deck in the rate deck repository that is to be replaced by the new rate deck.

The rate deck generator is configured to also modify an expiration time of the assigned current rate deck so that is antedates the effective time of the new rate deck. The hash generator is configured to generate a unique subscriber rate deck hash for each identified subscriber, and to embed various information that includes at least the unique subscriber rate deck hash into the access URL.

A rate deck updater is also in communication with the rate deck generator and the hash generator, and is in communication with the rate deck and subscriber repositories. The rate deck updater is configured to generate one or more messages that incorporate the embedded access URL and the effective time, to be communicated to the subscribers. The rate deck updater is also adapted to receive one or more electronic messages from the identified subscribers.

The electronic messages may include various information, and will incorporate at least the embedded access URL, and to evaluate the unique rate deck subscriber security hash and to therefrom authenticate the subscriber. If the subscriber is authenticated, the rate deck updated or another component is adapted to communicate the new rate deck and the unique rate deck file hash to the subscriber or another entity.

The rate deck updater is also implemented to identify and archive from the electronic request source identifier data, which includes for illustration purposes but not limitation, one or more source information identifiers. The source information identifiers can include one or more requestor emails and/or social media addresses, URL access user names and passwords, one or more source local IP addresses and intermediate route IP addresses, and source media access control MAC addresses, among other information and identifiers.

The rate deck updater, or other components of the throttle and rate deck synchronization system are also configured to evaluate the unique subscriber rate deck hash to uniquely identify and to authenticate the identified subscriber. These components are also adapted to communicate in reply to the electronic message, an error message if the evaluated unique subscriber rate deck hash does not enable authentication of the identified subscriber and or subscribers. Additionally, the rate deck updater and or other components are configured to generate a download confirm upon successful communication of the new rate deck and the unique rate deck file hash in reply to the electronic access request.

Any of the preceding arrangements may also include the throttle and rate deck synchronization system and one or more components thereof, including for purposes of example, the processor configured to receive and to parse subscriber identifiers from routing requests from the external network. The rate deck updater and or other components are further adapted to identify in the rate deck repository at least one rate deck having an expired time and being associated with the subscriber identifiers. These components are also implemented to generate a service unavailable message in reply to the routing requests, if the download confirm is not detected. Further, these components are also adapted to forward the routing requests if the download confirm is detected.

In other variations, the preceding telephony network traffic throttle and rate deck synchronization system adaptations will also be in communication with subscriber and rate deck repositories and with an inbound switch fabric and an external network, and will incorporate a request processor.

Among other capabilities, the request processor is configured to receive from the external network an electronic request to retrieve a new rate deck, wherein the request includes and or is associated with an internet protocol (IP) request or source address. The request processor is preferably adapted to also parse from the electronic request an access uniform resource locater (URL) that is embedded with a unique subscriber rate deck hash, and to evaluate the unique subscriber rate deck hash to generate at least one of a subscriber identifier and a rate deck identifier.

An authenticator also may be incorporated into the throttle and rate deck synchronization system, which is configured to generate and archive a request start time, to query the subscriber and rate deck repositories with one or more of the subscriber and rate deck identifiers, and to identify at least one new rate deck associated to either the subscriber and or the rate deck identifier evaluated from the unique subscriber rate deck hash. The request processor is further adapted to communicate, if a corresponding subscriber and rate deck are identified, the new rate deck and a unique rate deck file hash to the corresponding subscriber and in reply to the electronic request. Also, the authenticator is configured to generate and archive a request stop time and a request status message when the new rate deck and generated rate deck file hash have been communicated.

In certain arrangements, the request processor or another component is adapted to communicate upon request and automatically, in reply to the electronic access request, the request start and stop times and the status message, and at least one request source identifier data. The request processor and or other components are also configured to identify and archive from the electronic access request, one or more request source identifier data that include one or more of email and or social media addresses, URL access user names and passwords, one or more intermediate and source local IP addresses, and source media access control MAC addresses, any or all of which may be archived.

The request processor is further configured in other variations to communicate in reply to the electronic request, an error message, if the evaluated embedded unique subscriber rate deck hash does not enable identification of one or more of a corresponding subscriber and rate deck. In other variations, the authenticator is also adapted to archive the error message reply and the evaluated unique embedded subscriber rate deck hash. Additionally, the authenticator is enabled to generate a download confirm, if the new rate deck and the unique rate deck file hash are communicated successfully.

As described for various preceding arrangements, the throttle and rate deck synchronization system of these arrangements include the at least one processor being configured to parse the subscriber identifiers from routing requests that are received from the external network. Here, the authenticator detects the new rate deck download confirm, and identifies in the rate deck repository at least one rate deck having an unexpired time and being associated with the subscriber identifier. The processor or another similarly configured component then forwards the routing requests if rate decks are identified as having unexpired times and the new rate deck download confirm is detected. Otherwise, the component or processor instead responds with a service unavailable message, if the new rate deck download confirm is not detected.

In further variations of methods of optimizing utilization of telephony traffic networks and synchronizing call routing rate decks, including generating new rate decks, the processor or another component include a memory and are in communication with the rate deck and subscriber repositories. The processor or other component generate a new rate deck that includes, among other elements, an effective time, an expiration time, and a plurality of rate costs per unit time for passing a call routing requests to respective destination numbering plan areas/local number prefixes (NPAs/NXXs).

An access uniform resource locater (URL) for the new rate deck, and a unique rate deck file hash for the new rate deck are both generated and stored in a location, such as the rate deck repository. Subscribers are then identified who have an assigned current rate deck in the rate deck repository, which rate deck is to be replaced by the new rate deck. Upon generating the new rate deck, an expiration time of the assigned current rate deck is modified to antedate the effective date-time so that the old, current rate deck expires before the effective date-time of the newly generated rate deck. Also, a unique subscriber rate deck hash for each identified subscriber is generated, and embedded into the access URL.

To enable authenticated access and downloading of the new rate deck, one or more messages are generated and periodically communicated before and after the effective time to the identified subscribers. The messages include at least the embedded access URL and the effective time. In response, electronic messages are received from the identified subscribers that incorporate the embedded access URL. The embedded access URL is evaluated to enable parsing of the unique rate deck subscriber hash therefrom, which is used to authenticate the subscriber. Upon successful identification and authentication, the new rate deck and the unique rate deck file hash are communicated in reply to the received electronic messages if the subscriber is successfully authenticated.

Any of the described variations of the throttle and rate deck synchronization system are also adapted to evaluate the unique subscriber rate deck hash to authenticate the identified subscriber, and to communicate in reply to the electronic message an error message if the evaluated unique subscriber rate deck hash does not enable authentication of the identified subscriber. Further, a download confirm is generated if the new rate deck and the unique rate deck file hash are communicated successfully in these configurations.

As with preceding arrangements, routing requests are received over an inbound switch fabric and an external network, which are parsed to obtain subscriber identifiers and used for detecting a download confirm for the subscriber identifiers and an assigned rate deck that has an unexpired time. A service unavailable message is communicated in reply to the routing requests if the download confirm is not detected. In contrast, the routing requests are instead forwarded if the download confirm is detected.

In still other variations of methods for optimizing utilization of telephony networks and synchronizing call routing rate decks, new rate decks are generated and securely communicated and or downloaded, when electronic requests are received from the external network requesting access to retrieve the new rate deck. The requests include an access URL that is embedded with a unique subscriber rate deck hash, and an internet protocol (IP) address.

Upon receipt of the electronic message and request for the rate deck, a request start time is generated and archived, and the embedded unique subscriber rate deck hash is evaluated to identify a subscriber from the electronic request. Using the identified subscriber and the subscriber and rate deck repositories, a corresponding new rate deck is identified. If the corresponding new rate deck is identified, the new rate deck and a rate deck file hash are communicated in reply to the electronic request. Also, a request stop time and a request status message are generated and archived after the rate deck and unique rate deck file hash have been communicated.

In some adaptations, in reply to the electronic access request, the request start and stop times, the status message, and a request source identifier data are also communicated to confirm communication and downloading of the new rate deck and associated hash. The start and stop access request times, the access status message, and the request source identifier data are also archived and communicated to an external archive. As in other described configurations, an error message is communicated in reply to the electronic request if the evaluated embedded unique subscriber rate deck hash does not enable identification of a corresponding subscriber and new rate deck.

Also as before, a download confirm is generated if the new rate deck and the unique rate deck file hash are communicated successfully. If the new rate deck download confirm is detected, as routing requests are received and subscriber identifiers are parsed and have associated new rate decks, then the routing requests are forwarded.

On the other hand, a service unavailable message is communicated instead, when the download confirm is not detected, which prevents passing or forwarding of traffic based upon obsolete rate decks and rates and costs. In these ways, the new throttle and rate deck synchronization systems ensure optimal infrastructure utilization and prevent use of both inefficient infrastructure, and use of efficient infrastructure by inefficient call routing requests and telecommunications traffic.

In other aspects of exemplary implementations of the telephony network traffic throttle and rate deck synchronization system and traffic throttling and rate deck synchronization methods, the throttle and methods include a plurality of computer processors, transient memories and non-transient computer-readable storage media, network subsystems and interfaces, user interfaces and displays, switch fabric, and communications capabilities. These components and subsystems are or may be in part collocated, separately configured or integrally combined, and are also configured in well-known geographically disparate, cloud-based arrangements that enable optimized and on-demand resource allocation, reliability, resilience, automated and instantaneous or near instant fail-over, and system-wide durability, using a variety of widely-available information technology architectures and implementations.

This summary of the implementations and configurations of the telephony network traffic throttle and rate deck synchronization system and traffic throttling and rate deck synchronization methods, is intended to introduce a selection of exemplary implementations, configurations, and arrangements, in a simplified and less technically detailed arrangement, and such are further described in more detail below in the detailed description.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be better understood by those skilled and knowledgeable in the relevant fields of technology, with reference to the following description and drawings.

BRIEF DESCRIPTION OF THE DRAWING(S)

A more complete understanding of example implementations of the present disclosure may be derived by referring to the detailed description and claims when considered with the following figures, wherein like reference numbers refer to similar elements throughout the figures. The figures and annotations thereon are provided to facilitate understanding of the disclosure without limiting the breadth, scope, scale, or applicability of the disclosure. The drawings are not necessarily made to scale, and include:

Figure 6:
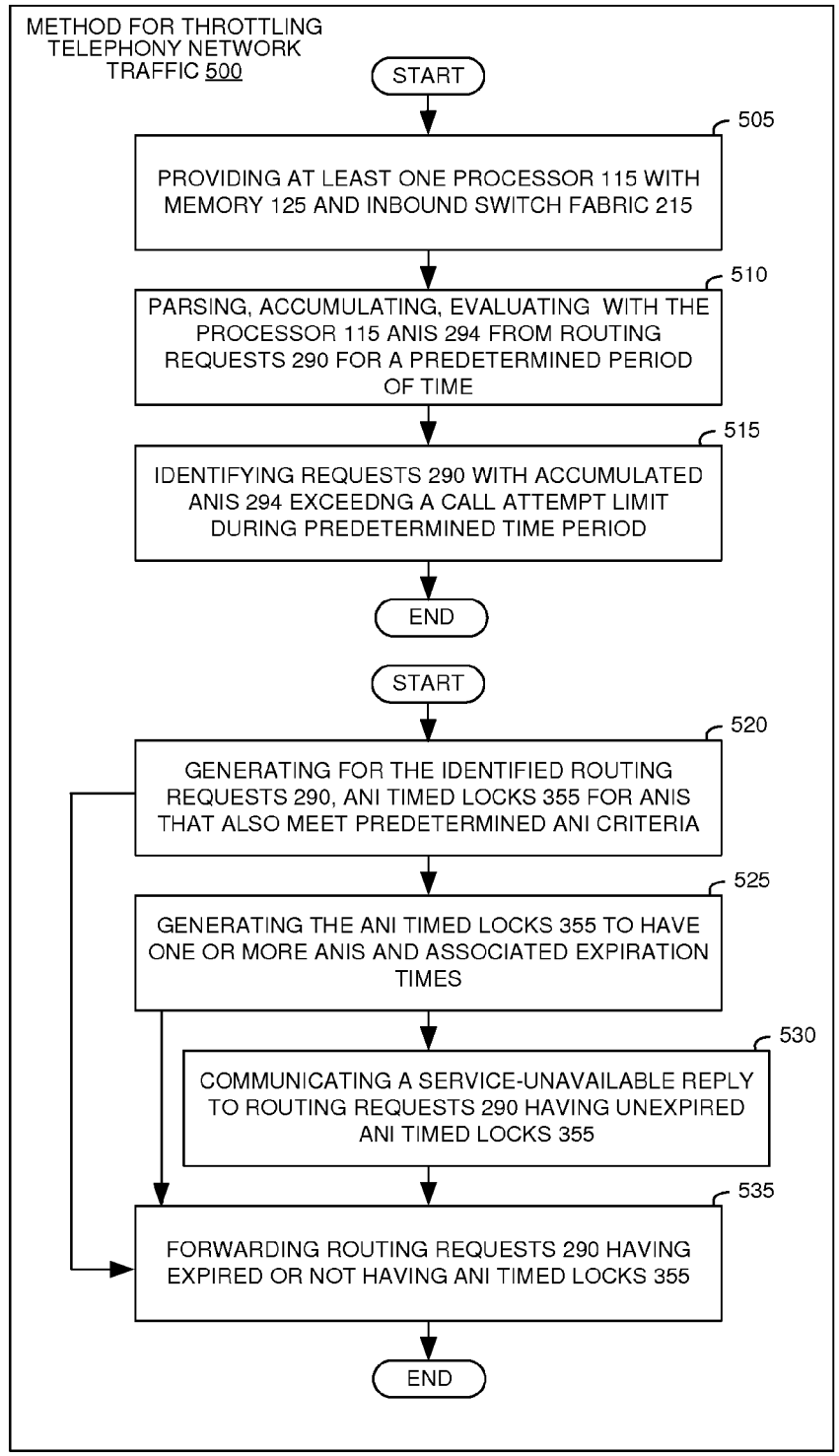
FIG. 6 depicts a method of throttling telephony network traffic with the system of FIGS. 1, 2, 3, 4, and 5.
Figure 7:
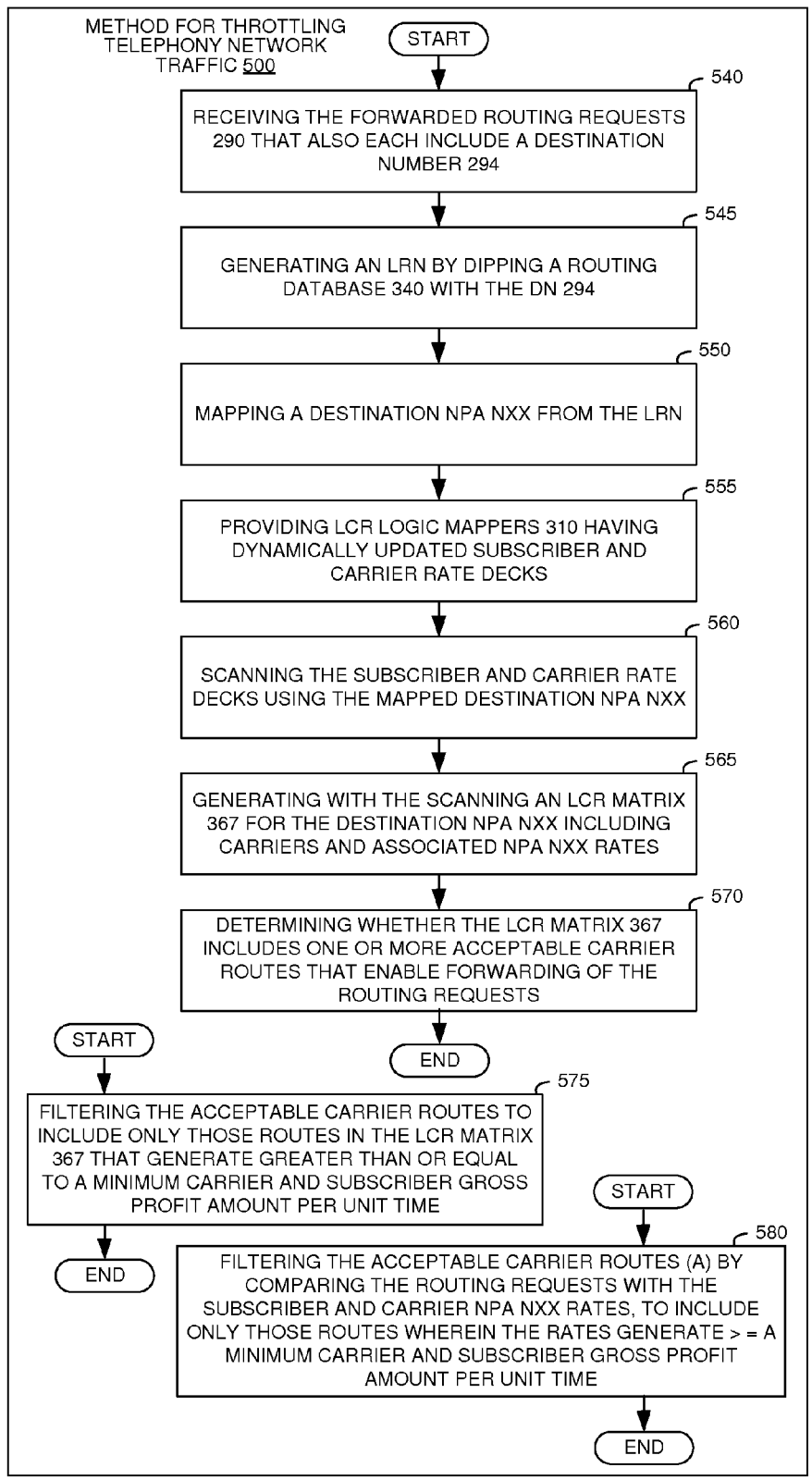
FIG. 7 depicts additional aspects of the method of FIG. 6.
Figure 8:
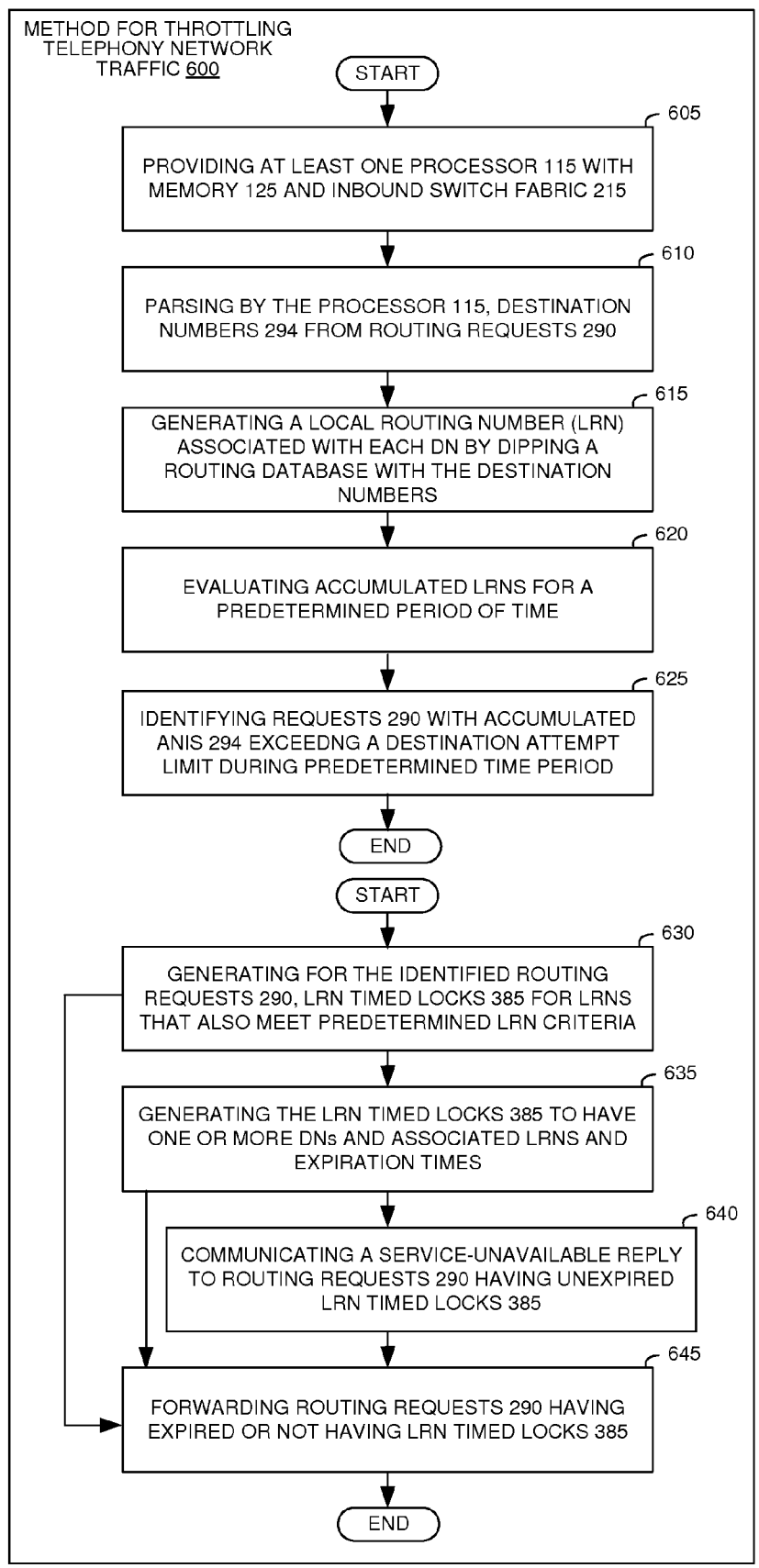
Figure 9:
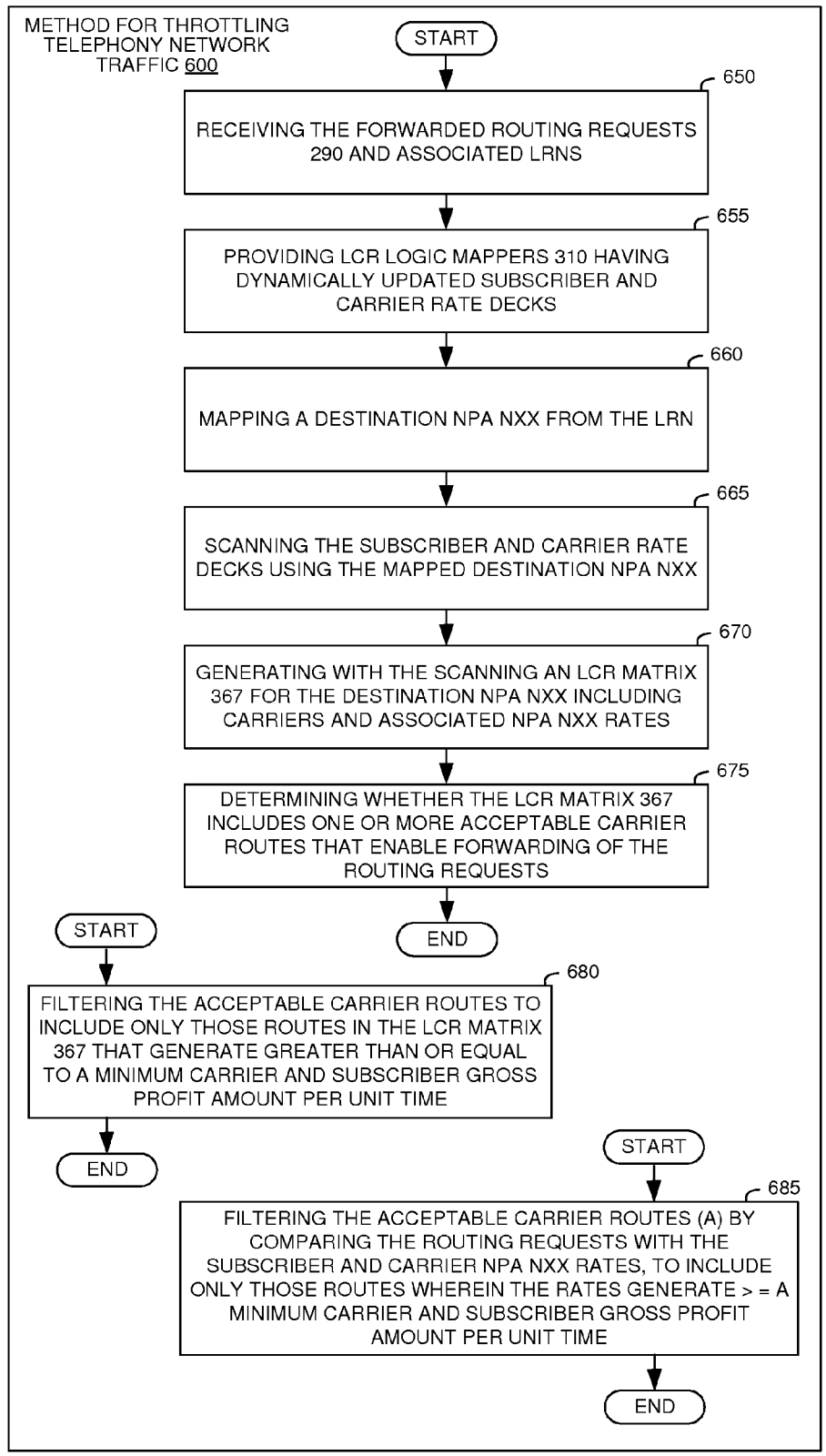
Figure 10:
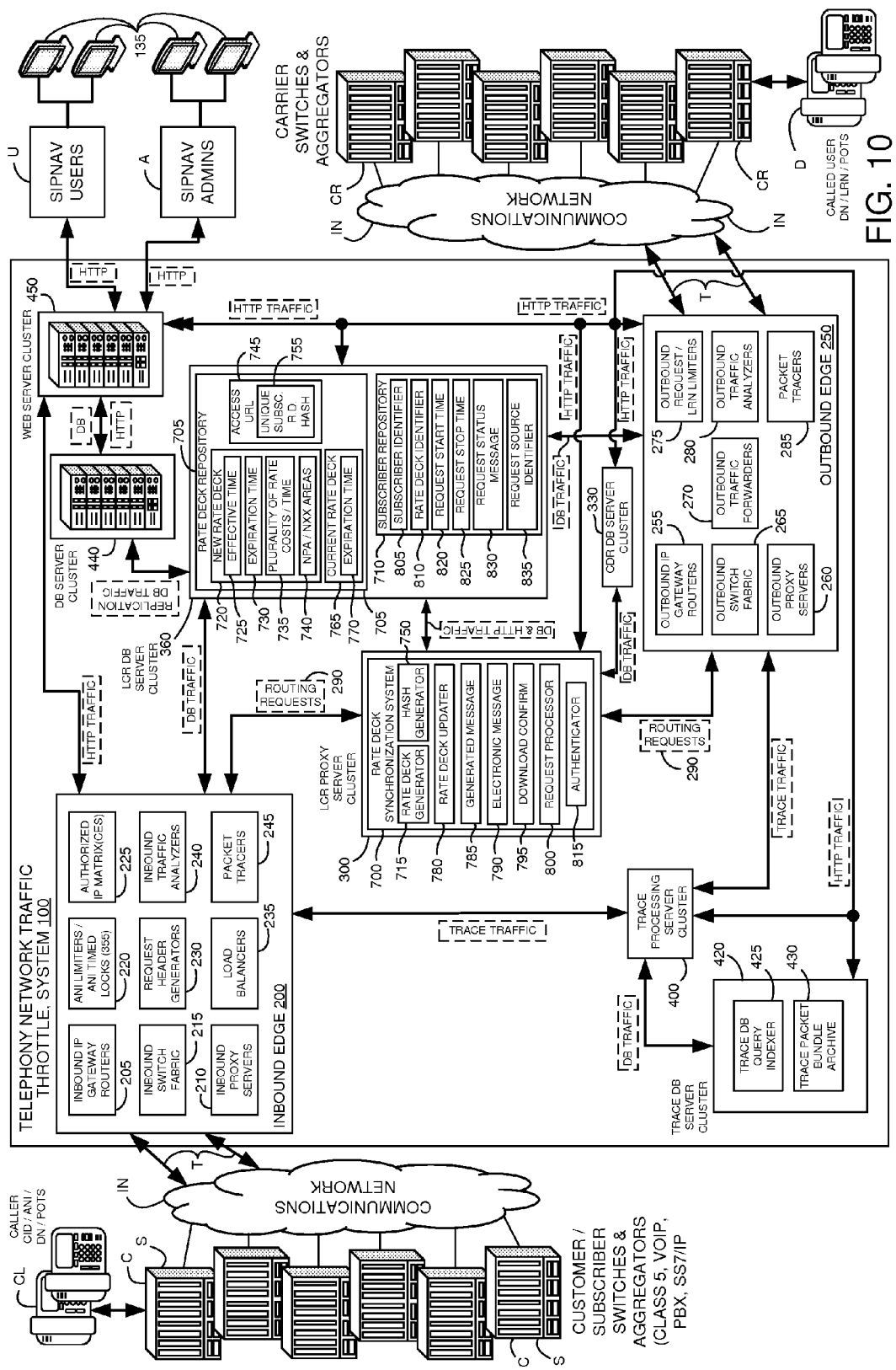
Figure 11:
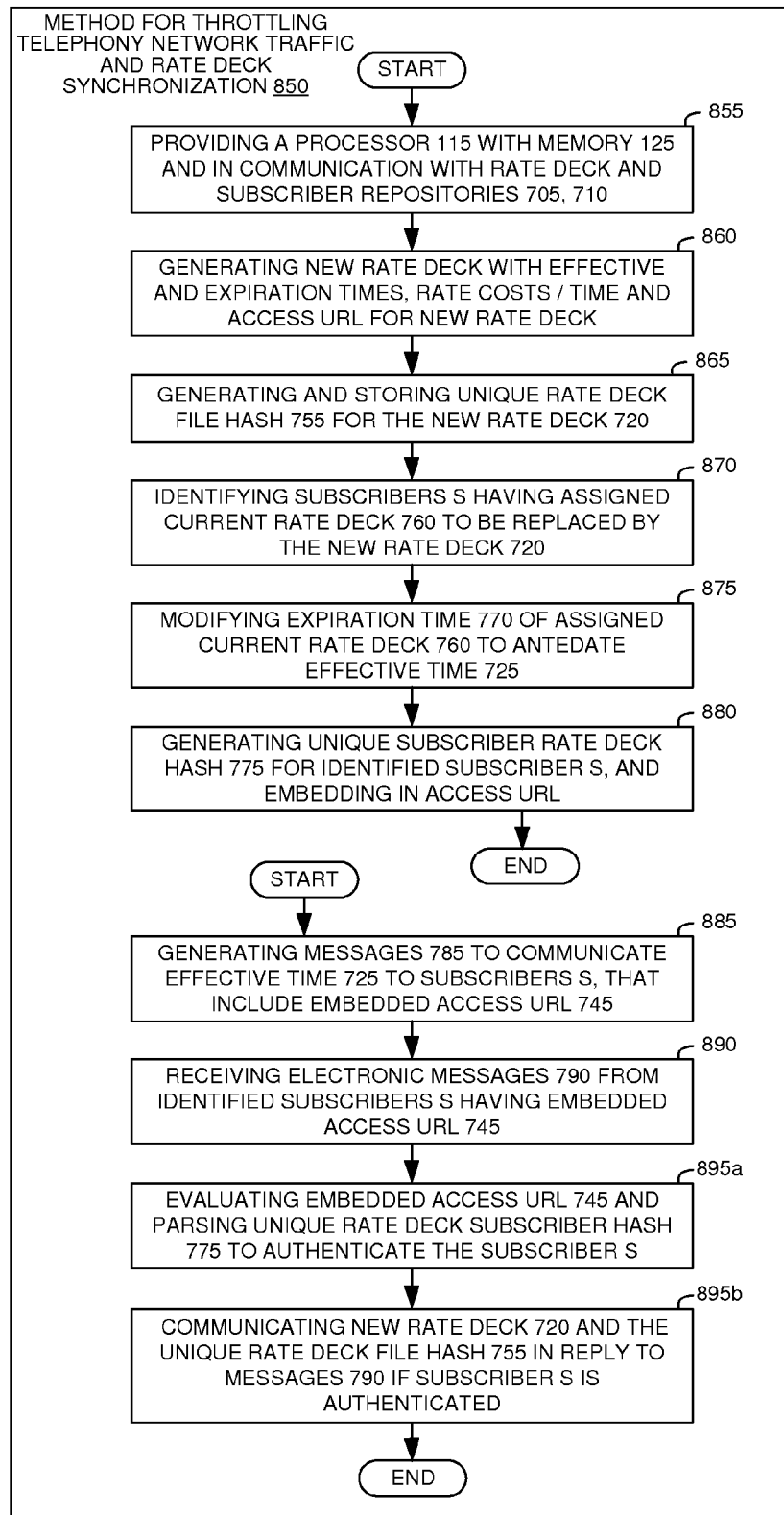
Figure 12:
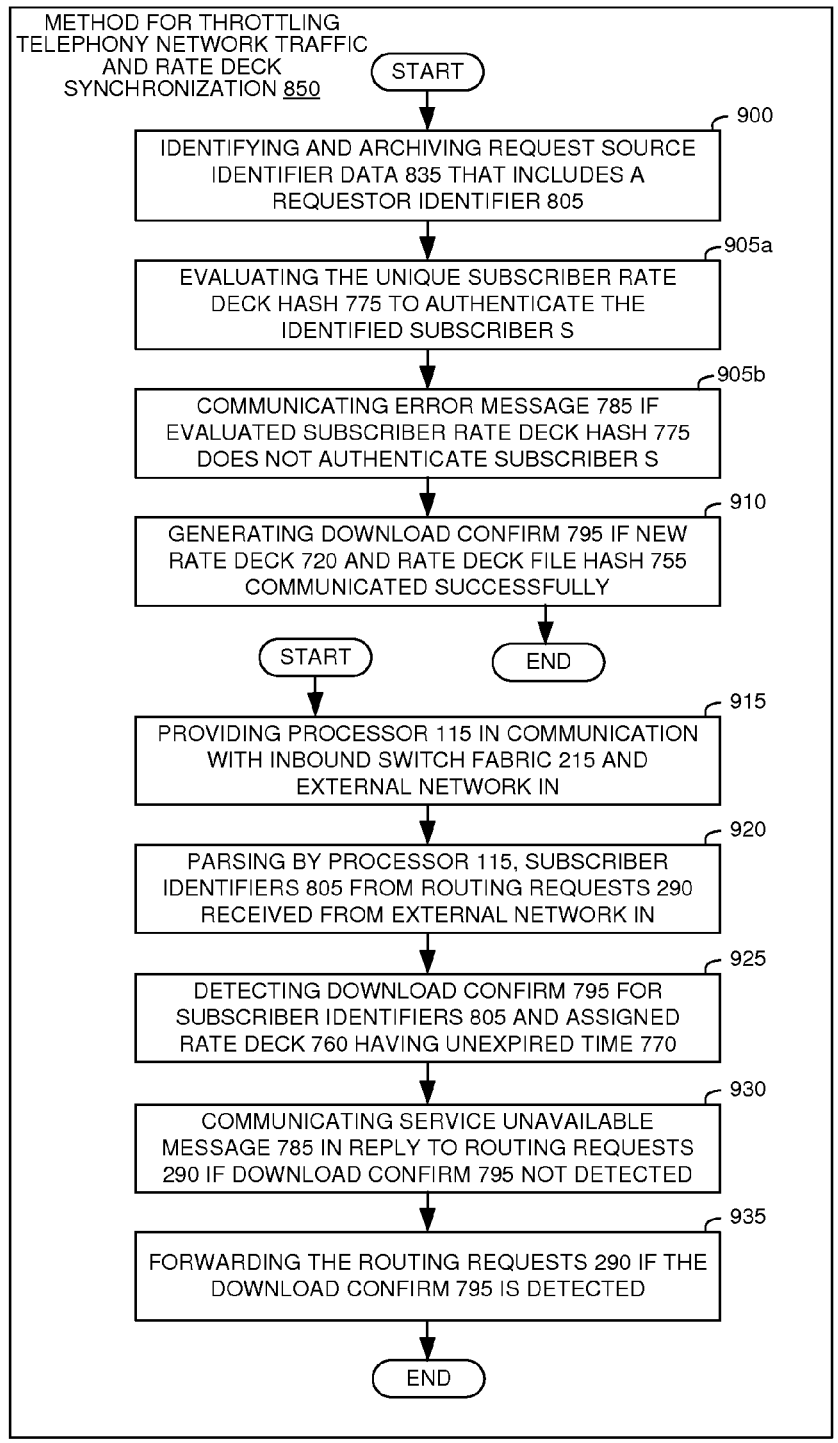
Figure 13:
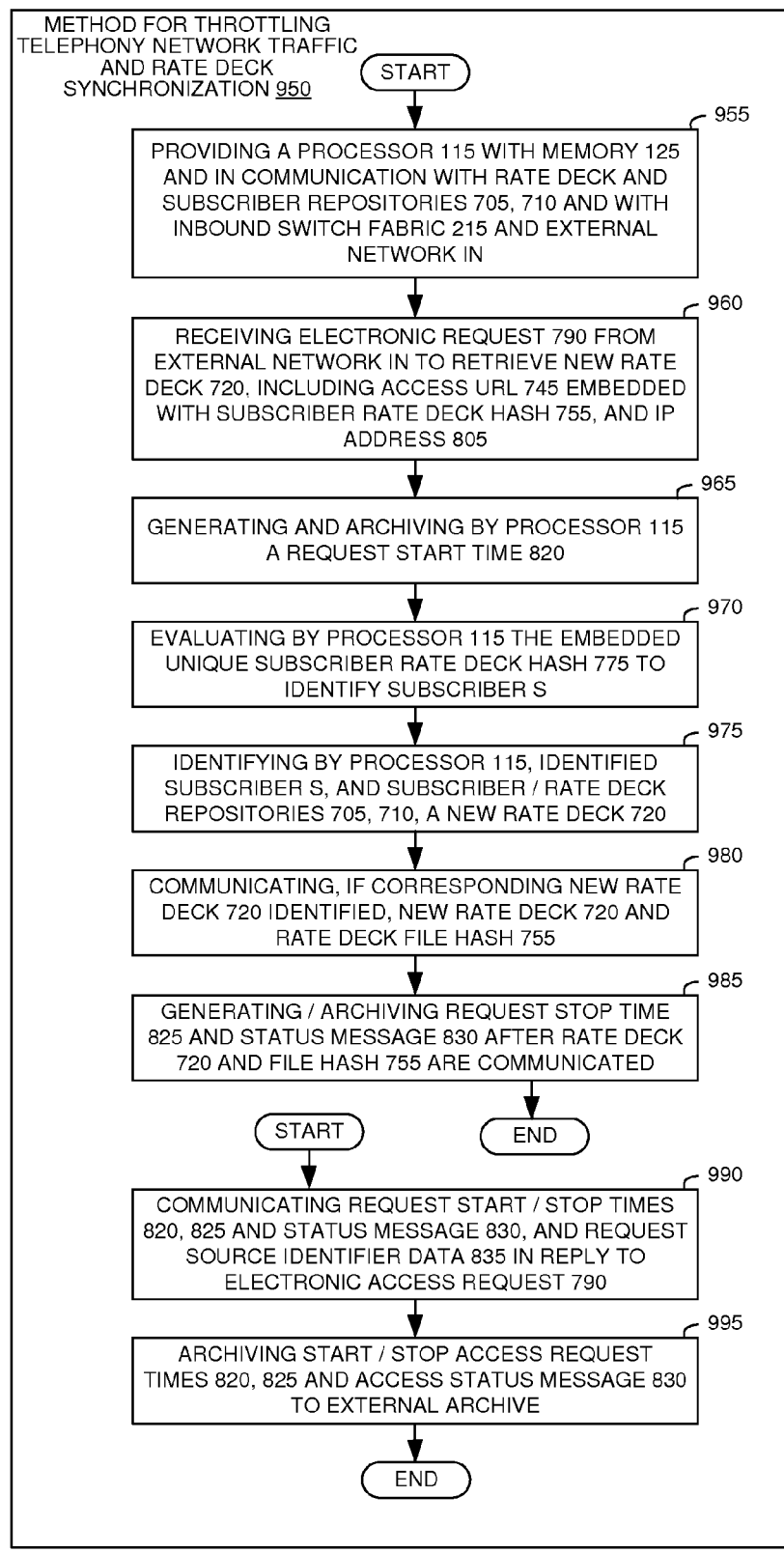
Figure 14:
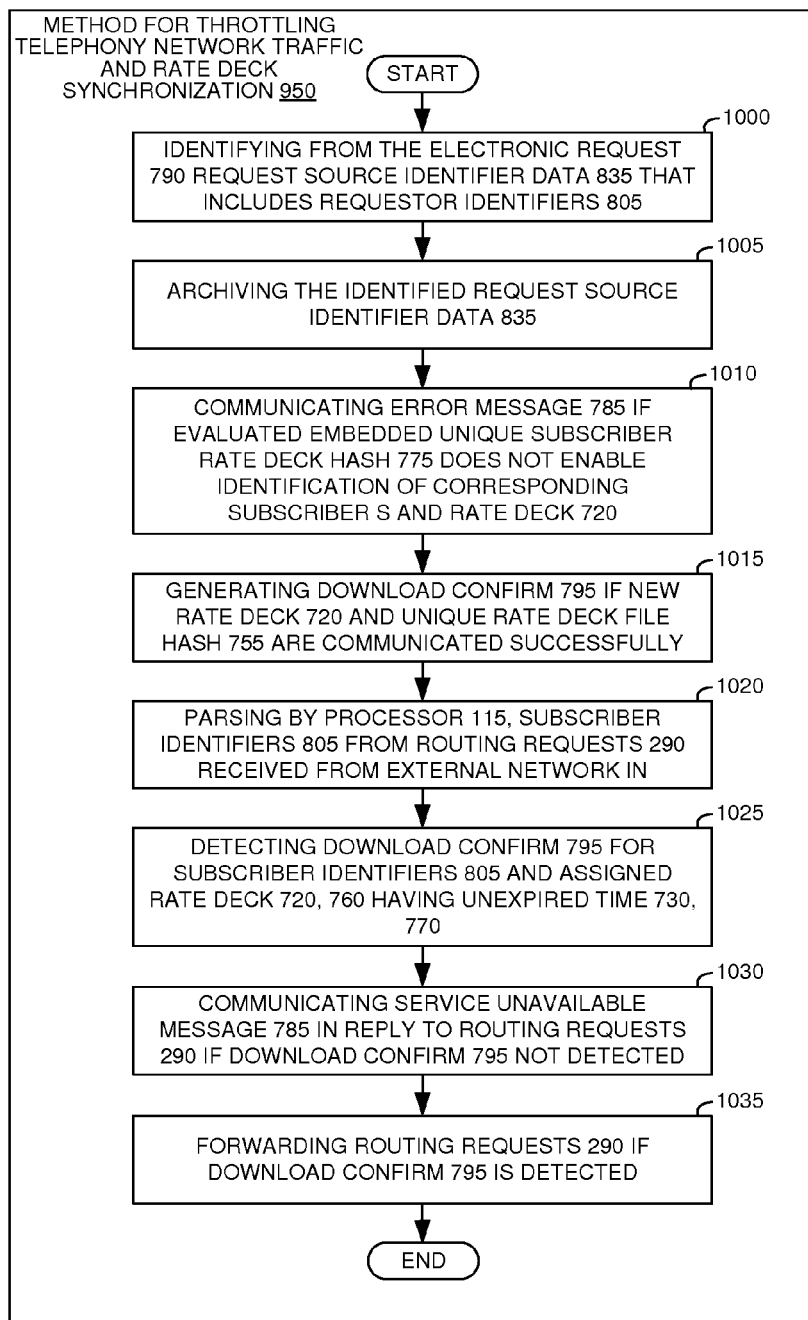

FIG. 8 describes another method of throttling telephony network traffic with the system of FIGS. 1, 2, 3, 4, and 5, and the methods of FIGS. 6 and 7;

FIG. 9 illustrates additional aspects of the method of FIG. 8;

FIG. 10 depicts an exemplary configuration of the preceding figures that incorporates the telephony network traffic throttle and rate deck synchronization system capabilities;

FIG. 11 describes methods of throttling of the preceding figures and rate deck generation and synchronization capabilities;

FIG. 12 illustrates additional aspects of the methods of FIG. 11;

FIG. 13 depicts further methods of rate deck generation and synchronization as represented in FIGS. 11 and 12; and FIG. 14 describes additional aspects of the preceding figures and configurations and the methods of FIGS. 11, 12, and 13.

DETAILED DESCRIPTION

The following detailed description is exemplary in nature and is not intended to limit the disclosure or the application and uses of the implementations, systems, components, and methods as set forth in the claims that follow. Descriptions of specific devices, techniques, methods, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary, or the following detailed description. The present disclosure should be accorded scope consistent with the claims, and not limited to the examples described and shown herein.

Example implementations of the present disclosure may be described herein in terms of schematic, functional, physical, and/or logical block components and various method and processing steps. It should be appreciated that such block components may be realized by any number of hardware, software, and/or firmware components customized and configured to perform the specified functions.

For the sake of brevity, conventional techniques and components related to use during operations, and other functional aspects of the systems (and the individual operating components of the systems), may not be described in detail herein. In addition, those skilled in the art will appreciate that example implementations of the present disclosure may be practiced in conjunction with a variety of hardware, software, networked, internet-based, cloud-based configurations of the telephony network traffic throttle, systems, components, and traffic throttling methods, which may further incorporate various combinations of such implementations.

With reference now to the various figures and illustrations and specifically to FIGS. 1, 2, 3, 4, 5, 6, 7, 8, and 9, a telephony network traffic throttle and system 100 and methods 500, 600 for throttling network traffic T are described. With specific reference to FIG. 5, the throttle 100 and methods 500, 600 are implemented on at least one computer system 110 having at least one processor 115 in communication with one or more non-transient storage media 120 such as a memory 125 and a permanent storage and storage cluster(s) 130.

The computer system 110 and its components are coupled to input and output devices and a display that enable a user interface 135. The telephony network traffic throttle and system 100 is in communication with a network IN and switch fabric 140 via communications devices 145 that include switches, routers, firewalls, modems, and other similar network devices 150. For improving and optimizing internal communications with the throttle 100 and rate deck synchronization system 700, multiple signaling and data communications protocols are used to optimize bandwidth availability and to enable multiple concurrent and redundant bandwidth channels, as well as server and cluster multihoming capabilities for the various servers, DBs, and components.

For example, the internal and external network traffic T and packet capture trace processing is enabled using any number of suitable trace traffic protocols, which enables concurrent use of internal and external communications bandwidth. Communication of data between various servers and databases is enabled using various types of database (DB) traffic protocols optimized for DB data communications, as described elsewhere herein. Still other communications channels are enabled using HTTP traffic protocols, as well as a number of other equally effective media and data communications protocols that enable high-volume, high-speed, and high-reliability utilization of the various channels and aggregate bandwidth illustrated in the figures and describe herein.

The telephony network traffic throttle and system 100 and related methods 500, 600 also contemplate being enabled and embodied in a computer program and computer program product 160, which includes computer readable media 165 on which is stored computer or program code 170 that can be further embedded on, stored on, and or retrievable from one or more computer readable storage media 175. Such code 170 enables the various components, configurations, and capabilities described elsewhere herein of the system 100 and methods 500, 600. A computer readable signal media and communications subsystem 180 is also shown that enables the system 100 and methods 500, 600 to operate on one or more of the actual and or virtual computer systems 110, which can operate in stand alone, combination, and clustered arrangements.

With these example architectural arrangements, various hardware and virtual hardware configurations can also be realized to enable the system 100 and methods 500, 600 to communicate and utilize such routers, networks, processors, servers, as well as server and storage clusters, which can include clustered, stand alone, virtual, and cloud computing hardware as a service (HaaS), platform as a service (PaaS), Internet as a service (IaaS), and among others, software and enterprise/environments as a service (SaaS, EaaS). These hardware and software infrastructure capabilities are available in-part from many vendors that include SipNav LLC (sipnavigator-com), Intel, Oracle, Hewlett-Packard, Cisco, Microsoft, VMWare, Amazon, and many others.

Figure 1:
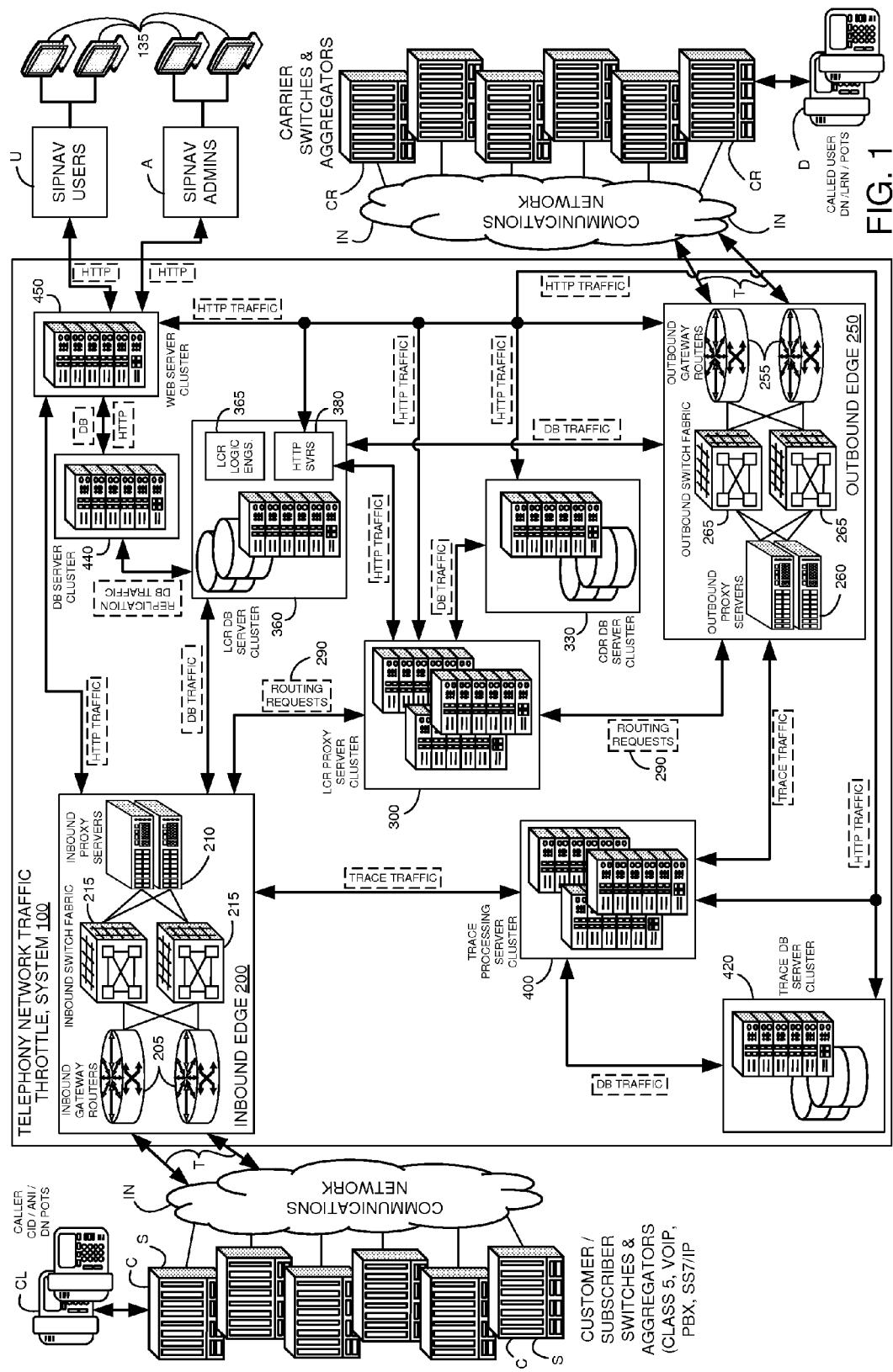
FIG. 1 is an illustration of a telephony network traffic throttle, systems, components, and methods.
Figure 2:
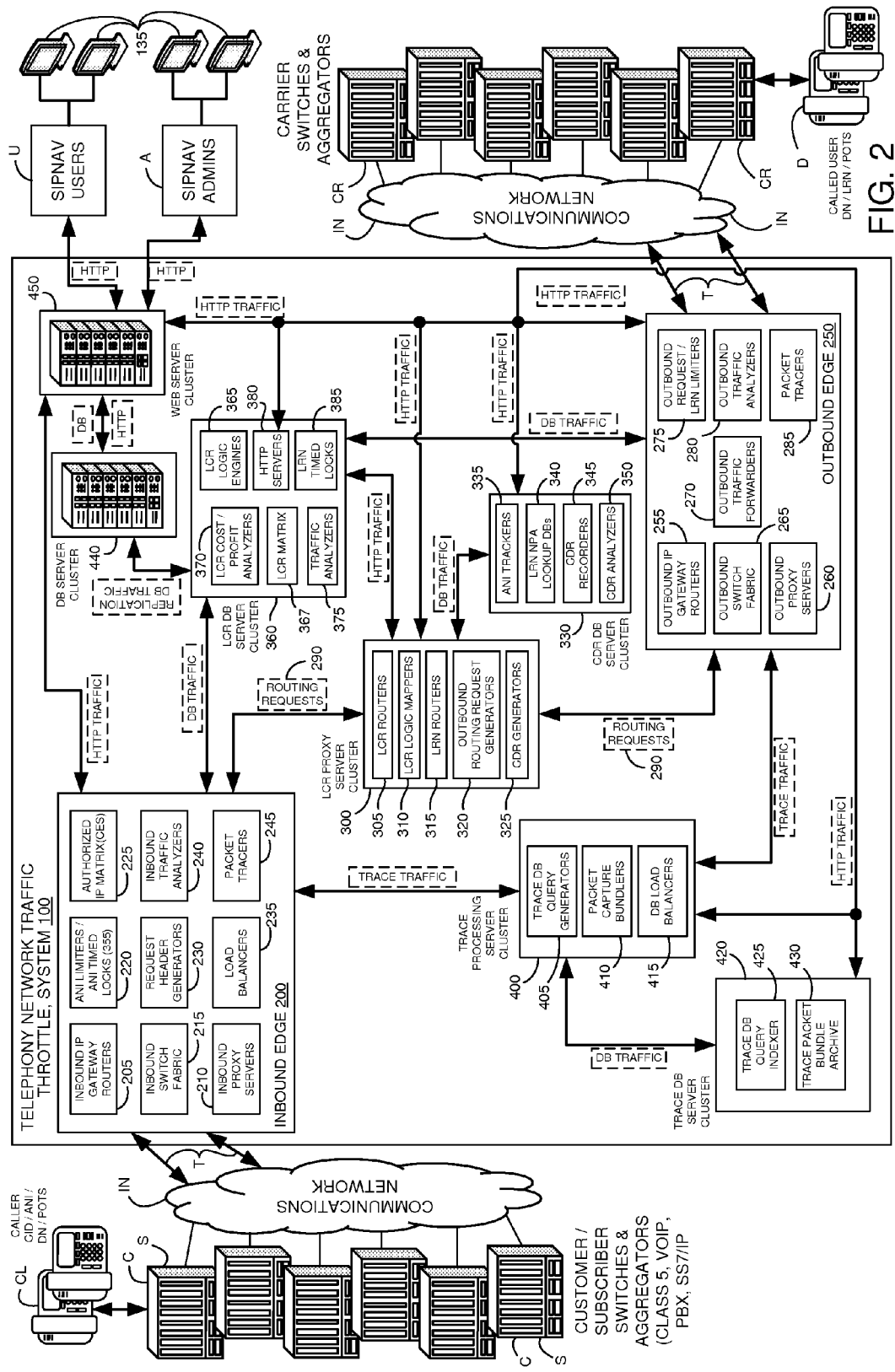
FIG. 2 illustrates additional aspects of the system and methods of FIG. 1.

With reference now also to FIGS. 1 and 2, the telephony network traffic throttle and systems 100 are coupled to and in communication with external subscribers S, customers C, such as LECs and CLECs, and carriers CR via any number of various connections to Internet protocol (IP) and communications networks IN, often referred to in-part as the communications network, backbone network, carrier network, Internet and or as the public telephone switched network, (PTSN) among other common telecommunications references.

The telephony network traffic throttle and systems 100 are configured to operate as a stand-alone system 100 operable with other systems to control traffic thereon, and can also be configured to be operable as part of and as an embedded element of such other systems. For example, the telephony network traffic throttle and systems 100 may be configured to enable new capabilities for existing and legacy switches and switching systems in a standalone arrangement, but to be operably connected to and embedded as an integral part of such switches and systems to enable new traffic control capabilities.

In an additional example, the telephony network traffic throttle and systems 100 may be embedded as part of telephony switches or switching systems. In either example, the telephony network traffic throttle and systems 100 will be in communication with an inbound edge 200 and an outbound edge 250 of such switches and systems. The inbound edge 200 will typically incorporate an inbound gateway router or routers 205 and inbound proxy server or servers or server clusters 210 coupled by an inbound switch fabric 215, which are configured to receive inbound traffic T from an external network such as the PTSN, communications and or telecommunications network, backbone, and internet network IN.

Although shown as separate devices for purposes of example, many telecommunications vendors and operators manufacture, configure, and enable stand alone systems that incorporate one or more or all of such devices into a single machine, which can be custom configured to enable one or more or all of the components and capabilities described in connection with the inbound edge 200.

In some configurations, the inbound edge 200 is physically connected via the switch fabric 215 by the inbound gateway router or routers 205, which are configured with externally facing IP addresses and ports that enable the subscribers S and customers C to communicate with and utilize the systems 100. The routers 205 are also configured to enable inbound traffic T to be forwarded to other components of the systems 100, and may further be configured with various network security capabilities such as filters, firewalls, network address translation (NAT), and port forwarding elements. The inbound proxy servers 210 are configured for added security and resource load balancing capabilities, which enables inbound traffic T to be inspected for traffic routing requests 290 (FIG. 3), and routed to the appropriate other components of systems 100.

The telephony network traffic throttle 100 is also described in FIG. 2 as incorporating a number of additional components for purposes of illustration, and with the intent that such added components may be incorporated into the inbound edge 200 as well as other components of system 100. Those knowledgeable in the field of technology also should understand that such added components may also be incorporated across the other components of system 100 as well as across and as part of other systems coupled to, in communication with, operative with, and functioning cooperatively with the telephony network traffic throttle and systems 100. These added components of inbound edge 200, as well as the later described components, are depicted as being part of the inbound edge 200 only for purposes of describing one possible exemplary configuration, but not for purposes of limitation.

More specifically, in FIG. 2 the inbound edge is depicted to also incorporate at least one automatic number identification/identifier (ANI) limiter 220 in communication with the other components of the inbound edge 200 and system 100, and which can also be configured as a standalone component and also as an element of other components of systems 100. In such arrangements, the at least one ANI limiter 220 is configured to receive and evaluate network traffic T via the router or routers 205, inbound switch fabric 215 and inbound proxy server of servers 210, and to parse received routing requests 290 to identify source information, such as a source telephone number TN that may be in the form of an automatic number identification or identifier. These terms are in some applications and systems also referred to as source or caller identification (CID), which is common with respect to plain old telephone systems POTS.

The ANI limiter is also configured to accumulate the inbound routing requests 290 for a predetermined period of time. The ANI limiter 220 is further configured to identify traffic T having routing requests 290 (FIGS. 1, 2, 3, 4) that are received from a caller or source CL that is generating a large number of routing requests 290 during the predetermined time period, which may exceed some predetermined ANI limit. The at least one ANI limiter 220 may be further configured to prevent forwarding of routing requests 290 that meet or do not meet additional criteria, and may be configured with additional capabilities and as described elsewhere herein.

At least one authorized IP matrix 225 is incorporated into the inbound edge 200, and can be included as a part of any other component in system 100 and or as a standalone device. The at least one authorized IP matrix 225 is configured to receive and store a plurality of matrices that include IP source addresses and related data, such as access credentials, security certificates, source proxy data, and other related data. The plurality of matrices identifies whether a caller or source CL is authorized to access the telephony network traffic throttle and systems 100, and can also include white list and black list data wherein white list data enables access to one or more components and capabilities of the systems 100, while blacklist data disables and prevents access to one or all components and capabilities of the systems 100.

The inbound edge 200 also incorporates for purposes of example, at least one routing request header generator 230, which can also be a part of other system components 100 among other variations. The routing request header generator 230 creates request headers that enable further routing of routing requests 290 through system 100 and to other external destinations. The generated request headers will typically include the IP addressing and authentication data needed to enable routing requests 290 to be received and decoded by external sources and destinations during operation of the systems 100.

In alternative variations of systems 100, at least one load balancer 235 is incorporated by the inbound edge 200 or another subsystem of component of systems 100, which is configured to balance the processor, storage, and switch fabric traffic internally and externally to and from the inbound edge 200 and other components of systems 100. In typical high-speed, high-volume traffic configurations, inbound traffic T and routing requests 290 may arise to tens of thousands or more routing requests or calls per second, and as many concurrently open sessions for each.

Even with very large scale systems 100 having dozens or more processors 115 and virtual processors and related devices, any single processor 115 instance can be overloaded unless the load imposed by such traffic T and requests 290 is spread across all available resources. Accordingly, the at least one load balancer 235 enables optimized resource utilization of systems 100, and can also further be configured to enable fail over and cloud virtualization of various capabilities of systems 100 whereby additional hardware and software resources and instances are brought online during periods of component unavailability, failure, and or high utilization of the components of systems 100.

One or more traffic analyzers 240 are also depicted in FIG. 2 as being included in the inbound edge 200, but can also be incorporated into other parts of systems 100. The traffic analyzers 240 are configured to receive routing requests 290 and to parse various communications parameters therefrom. The analyzers 240 are also configured to enable characterization of the types and quality of the routing requests, and to accumulate various IP statistics for purposes of enabling forensic analyses.

The accumulated IP statistics can also enable failure recovery, component error analyses and configuration optimization, and many other capabilities. Additionally included in inbound edge 200 or another component of systems 100 is one or more packet tracers 245, which are configured to parse specific IP addresses, tags, and port information from routing requests, and to generate and communicate trace route and ping and related analytical requests, which enables systems 100 to monitor for internal and external errors and traffic patterns.

In combination with the other devices of systems 100, the packet tracers 245 enable error detection, error correction, security enhancements, and troubleshooting capabilities. In turn, systems 100 utilize the inbound traffic analyzers 240 and tracers 245 to also detect and eliminate unauthorized traffic T that may attempt to access and utilize systems 100. Further, systems 100 can employ various configurations of the analyzers 240 and tracers 245 to cooperate with other components of systems 100, such as the trace server cluster 400, to substantially improve the quality of service provided to subscribers S, customers C, carriers CR, users U, and administrators A by detecting unoptimized or intermittently inoperable components, suboptimal load balancing, unauthorized uses, and suboptimal traffic patterns during operation of systems 100.

The outbound edge 250 incorporates outbound gateway routers 255 coupled by an outbound switch fabric 265 to outbound proxy servers 260. The routers 255, fabric 265, and proxy servers 260 are configured in similar ways to the comparable devices of the inbound edge 200, except that the outbound edge 250 devices 255, 260, and 265 receive the routing requests 290 and are optimized and configured for forwarding the requests 290 externally to carriers and aggregators CR and destinations D, to enable communication and eventual termination of the routing requests 290.

Outbound traffic forwarders 270 are incorporated with the outbound edge 250 (as depicted for an example in FIGS. 2, 3) and or any other components of outbound edge 250 and systems 100, and are configured to optimize, load balance, and if needed to encapsulate, error check, or wrap with a target or destination protocol the routing requests 290 before forwarding across the outbound proxy servers 260, and routers 255, to external carriers and aggregators CR and destinations or called users D.

Figure 3:
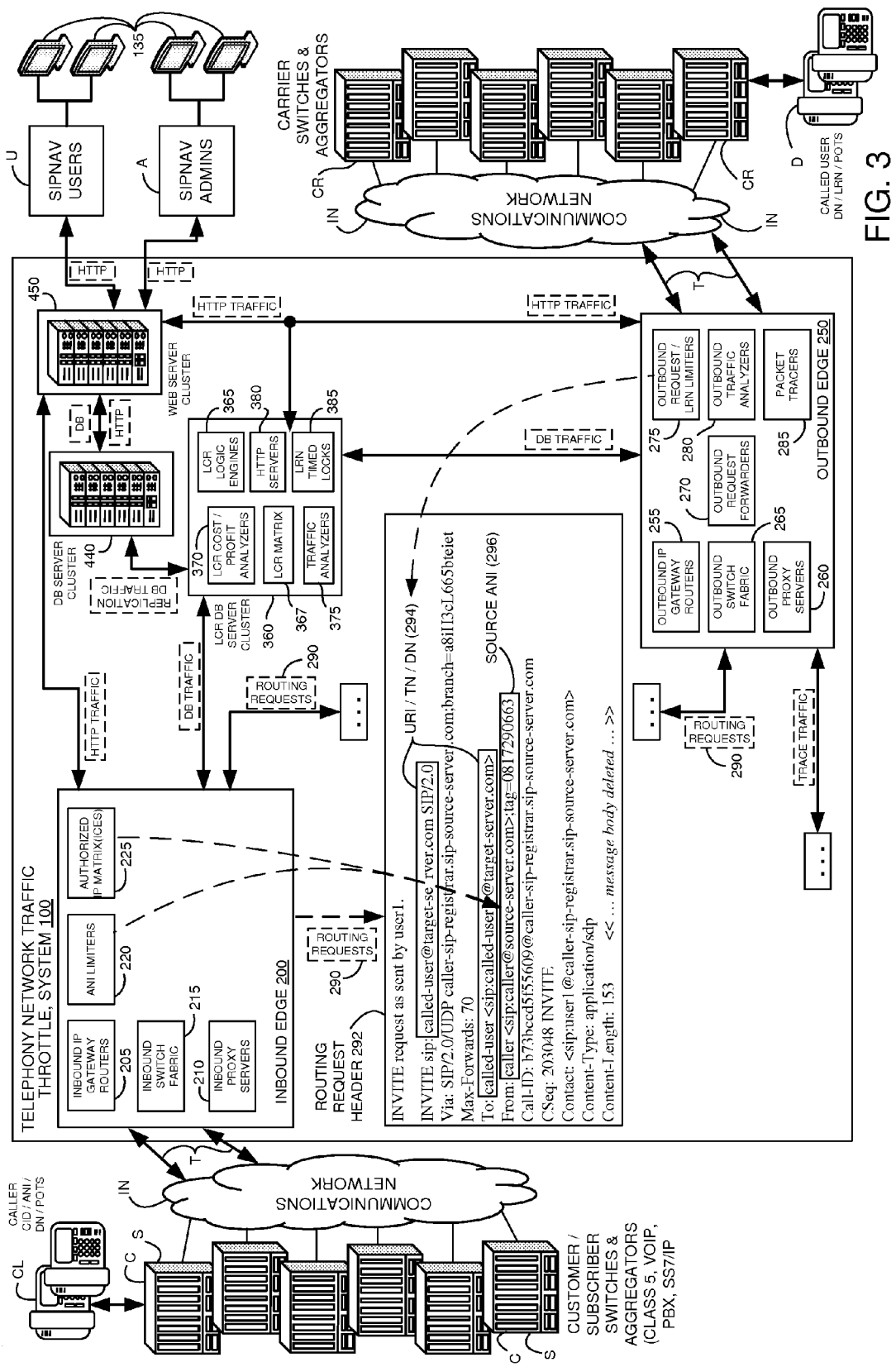
FIG. 3 depicts other aspects of the system and method of FIGS. 1 and 2 with various components and devices rearranged and or removed for illustration purposes.

The outbound edge 250 of FIGS. 2, 3 or another component or device of systems 100, further includes at least one outbound request limiter or local routing number (LRN) limiters 275. The LRN or outbound request limiters 275 may also be configured to operate in a standalone mode in communication with systems 100 and or is otherwise incorporated with the inbound edge 200 or any other component of systems 100.

The LRN limiters 275 are configured to receive and evaluate network traffic T via the router or routers 205, inbound switch fabric 215 and inbound proxy server of servers 210, and to parse received routing requests 290 to identify a destination number (DN) or destination information, such as a source telephone number (TN), which may be that same as the DN. Some communications protocols also refer to the TN or DN as a uniform resource identifier (URI).

The LRN limiters 275 are further configured to "dip" or query an NPA database to determine if URI/DN has been ported. If it has not been ported, then the LRN limiters generate either a null local routing number LRN and or associates the LRN to be the same as the URI/DN. If the URI/DN has been ported to an exchange different from an original exchange that previously serviced the URI/DN, then the LRN limiters 275 generate an LRN for the new exchange, and associates it to the URI/DN. The LRN limiters 275 also accumulate the inbound routing requests 290 for a predetermined period of time.

The LRN limiter 275 is further configured to identify traffic T having routing requests 290 (FIGS. 1, 2, 3, 4) that are being routed to a destination a large number of times during the predetermined time period, which may exceed a predetermined LRN limit. The LRN limiters 275 may be further configured to prevent forwarding of routing requests 290 that meet or do not meet additional criteria, and may be configured with additional capabilities and as described elsewhere herein. For example, the predetermined LRN limit may be set to 100 attempts to reach the DN during a predetermined time period of 30 minutes, or any other desired limits or ranges.

When the predetermined LRN limit is exceeded, then the routing requests 290 are identified, and further evaluated. The at least one LRN limiter 275 may be further configured to prevent forwarding of routing requests 290 that meet or do not meet additional criteria, and may be configured with additional capabilities and as described elsewhere herein.

The outbound edge 250 of FIGS. 1, 2, 3, and 4, and or any other component of systems 100 also incorporates outbound traffic analyzers 280 and outbound packet tracers 285, which may be part of, standalone from, and or cooperatively configured to operate with the inbound traffic analyzers 240 and inbound packet tracers 245. The outbound traffic analyzers 280 and packet tracers 285 are configured to enable the same capabilities of their inbound counterparts, but with respect to the outbound traffic.

With continued reference to FIGS. 1 and 2, and further attention invited to FIG. 3, it can be understood that the various components of systems 100 are configured for receiving routing requests 290 in any number of presently and prospectively available communications protocols and formats. While the media layers of systems 100, 700 are configured for communicating using ubiquitous internet physical, data, and network, and transport layer IP and ethernet protocols (See, e.g., above-described OSI 7 layer model), the systems 100, 700 are also configured for use with a variety of host layer protocols (transport, session, application, and presentation). The systems 100, 700 can include, among many others now in use and prospectively available, including for purposes of example without limitation, session layer hypertext transfer protocols HTTP and session initiation protocols SIP. Although examples will now be described with respect to SIP protocols, this is for purposes of illustration but not limitation. SIP is used here since it offers a human readable format that makes for good demonstrative exemplars. There are many other present and prospective communications protocols that are compatible for use with the telephony network traffic throttle and systems 100.

A routing request header 292 is depicted in FIG. 3, which has been received with a routing request 290, and which is shown with a body of the routing request 290 removed for clarity in focusing on the content of the header 292. It should be known to those skilled in the field that the header 292, being formed as a SIP protocol "invite" request, includes among other data, a target destination number DN 294, which is also referred to as a called party telephone number TN, or a uniform resource identifier URI. In some instances, the SIP request 290 and header 292 may also include an LRN.

However, even if an LRN is included, the DN is dipped in an NPA database to confirm it is accurate. As a billing fraud prevention and error checking capability, LRNs are typically generated by the systems 100 to ensure accurate resource utilization and billing. If the received LRN is different than the LRN generated from the dip or query to an NPA database, then additional criteria may include an error flag that can be used to limit or block calls from the associated ANI and or to the associated DN.

The telephony network traffic throttle and systems 100 also incorporate a least cost router LCR proxy server cluster 300, which is configured to intermediate communications of routing requests 290 and related data between the inbound edge 200 and the outbound edge 250, among many other capabilities. As routing requests 290 are received and forwarded between the edges 200, 250, the other needed resources of systems 100 are drawn upon by the LCR proxy server cluster 300 to enable operation of the systems 100. The LCR proxy server cluster 300 includes one or more LCR routers 305, LCR logic mappers 310, LRN routers 315, outbound routing request generators 320, and call detail record (CDR) generators 325.

A CDR database DB server cluster 330 is in communication with the LCR proxy server cluster 300 and is configured to receive and store generated CDRs for system performance tracking, record keeping, and billing. The CDR DB further includes ANI trackers 335, LRN NPA lookup dynamic routing DBs 340, CDR recorders 345, and CDR analyzers 350.

The ANI trackers 335 are configured to receive and accumulate ANIs 296 cooperatively with and or on behalf of the ANI limiters 220 and to identify ANIs 296 that accumulate in excess of a predetermined limit during a predetermined period of time. For example, if a specific source ANI 296 is accumulated over 100 times during a 30 minute period, or any other preferred limit or range, then that ANI 296 would be identified, and further analyzed against other additional, predetermined criteria.

The ANI limiters 220, ANI trackers 335, and or the CDR analyzers 350 in another arrangement are configured, either alone, separately, as a single combined device, and or in cooperation with each other, to generate an ANI timed lock 355 (FIG. 2) and communicate it to the ANI limiters 220 at the inbound edge 200. The timed lock 355 is configured to include a time duration, such as 24 hours, associated with the identified ANI that meets one or more of the additional criteria. The time duration may be shorter or longer, and may be designated in units of second, minutes, hours, days, and other units.

The ANI limiters 220 are also configured to generate the one or more ANI timed locks 355 for the identified call routing requests 290, which have ANIs 296 that also meeting one or more predetermined, additional ANI criteria.

For example, the ANI limiters 220 can be configured to generate the one or more ANI timed locks 355 for those ANIs having one or more of additional, predetermined criteria that include, for illustration purposes but not limitation, (a) an ANI short duration percentage (SDP) above an ANI SDP limit, (b) an ANI answer seizure ratio (ASR) below an ANI ASR limit, and (c) an ANI average call duration (ACD) below an ANI ACD limit, wherein criteria (a), (b), and (c) are some of the one or more additional, predetermined ANI criteria. Those knowledgeable in the technology should understand that many other criteria are also known and available for use to enable additional capabilities to the ANI limiters 220.

As a further example, identified ANIs 296 may be evaluated by the ANI trackers 335, the ANI limiters 220, and or the CDR analyzers 350, against an additional, predetermined criteria, for illustration purposes but not for limitation, to determine if they are associated with routing requests 290 that have an average call duration (ACD) below a certain ANI ACD limit, such as below 6 seconds. They may be evaluated to discern if they have a short duration percentage (SDP) above an ANI SDP limit, such as 35%. The ANIs 296 may be analyzed to determine if the ANI has an answer seizure ratio (ASR) below an ANI ASR limit, such as below about 15%. Any other preferred limits and ranges for these criteria and others are also compatible for use as described.

During the unexpired time of the ANI timed lock 355, prospective routing requests 290 having the identified ANIs 296 are detected by the ANI limiters at the inbound edge 200, and are not forwarded. The unforwarded routing requests 290 may or may not be sent a reply, and if a reply is communicated, then it can indicate that the request is refused. In the example of a SIP formed routing request 290, a reply such as "403 forbidden" and or "503 service unavailable," or any other appropriate message may be sent. See, for example, FIG. 4.

Additionally, in alternative arrangements, the ANI timed lock 355 may be utilized by other components and devices of systems 100 to forward a limited amount of routing requests 290 to thereby throttle the bandwidth available to forward routing requests 290 having unexpired ANI time locks 355. The bandwidth may be throttled or constrained to amounts between zero, that is no forwarding, and higher data communication rates as may be desired.

The LRN NPA lookup dynamic routing DBs 340 are configured with internally maintained, frequently updated and or real-time, dynamically updated NPA LNP, FLNP, WLNP databases, which include the exchange local routing numbers LRNs for all TNs, DNs, and URIs. The dynamically and or real-time updated DBs 340 ensure that accurate, as up-to-date as possible LRNs are continuously available as DNs are ported between exchanges.

The CDR recorders 345 are configured to record each call detail record (CDR) generated by the CDR generators 325 and to communicate the recorded CDRs to the trace DB server cluster 420. In addition to the previously described configurations, the CDR analyzers 350 are also configured to generate performance and statistical analyses of systems 100, as needed by users U and administrators A for troubleshooting errors, billing, and forensic evaluations and analyses needed to optimize and maintain the systems 100.

Figure 4:
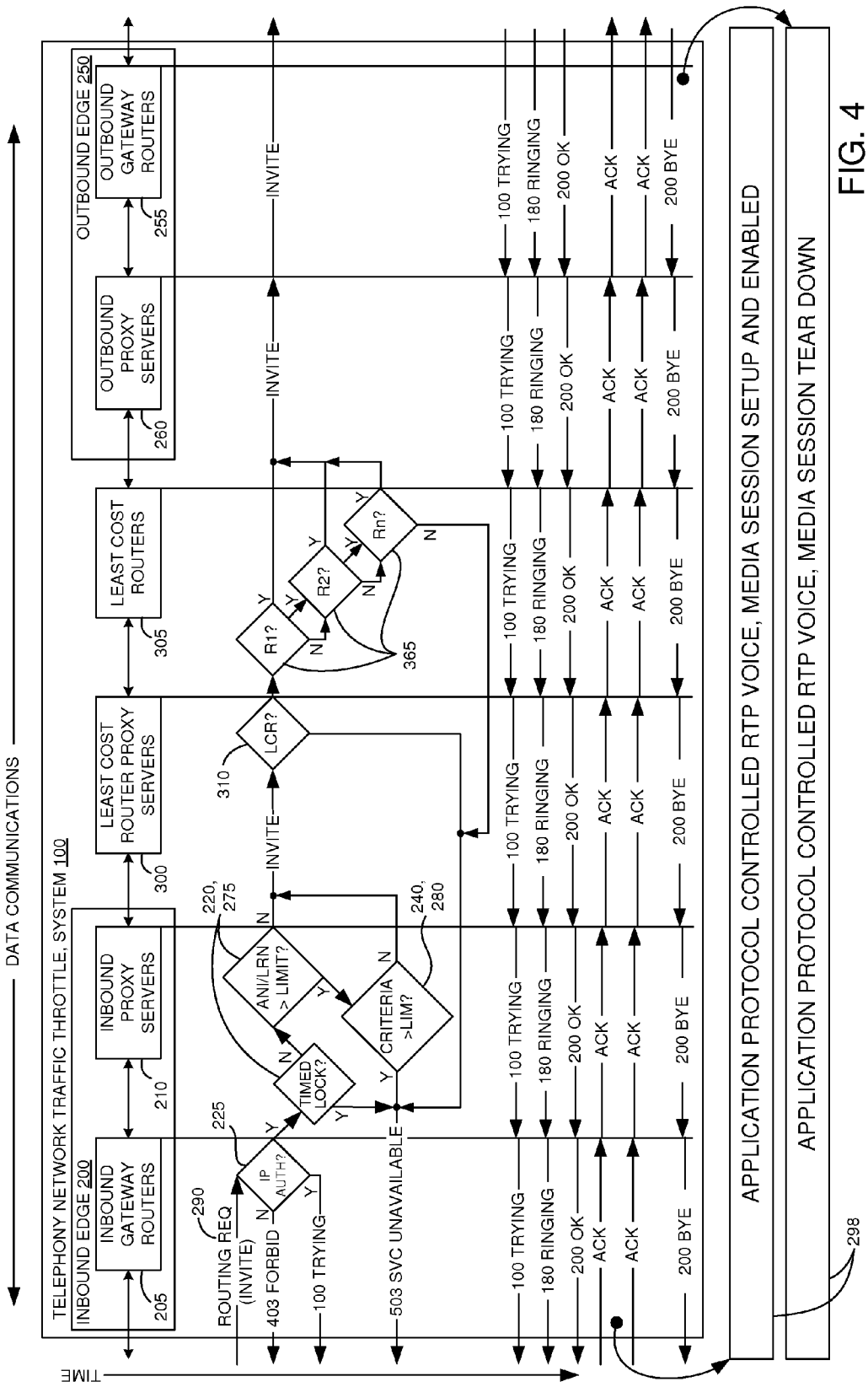
FIG. 4 shows further capabilities and aspects of the system and method of the preceding figures, with certain capabilities depicted, and various components rearranged or removed for illustration purposes.
Figure 5:
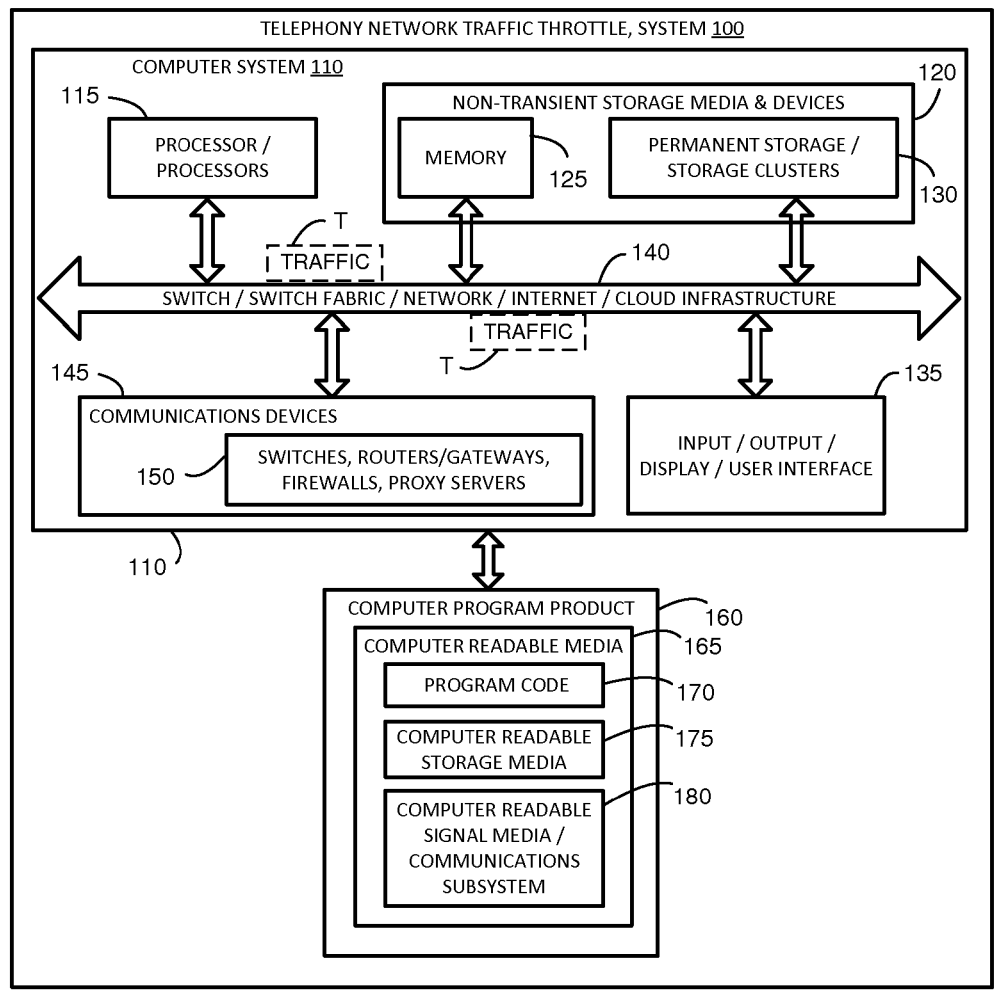
FIG. 5 illustrates an exemplary schematic of a hardware architecture of the system and methods of the preceding figures.

For routing requests 290 that do not have ANIs 296 that exceed the ANI limits, the routing requests 290 are forwarded as described elsewhere herein, to enable establishment and eventual tear-down of voice, media sessions 298. An example of the timing and data communications exchanged between systems 100 and external carriers and aggregators during voice, media session set-up, establishment, and tear-down are illustrated in FIG. 4.

The LCR routers 305 are configured to receive the DNs parsed from the routing request, and to poll the LRN routers 315, which are configured to dip the DNs against the LRN NPA lookup dynamic routing DBs 340, to thereby determine if the DNs have been ported, and if so, to generate the destination LRN. With the destination LRN or confirmation of a non-ported DN, the LCR routers 305 are further configured to poll the LCR logic mappers 310 and scan the dynamic routing DBs 340 for one or more acceptable routes to the DN or LRN of the routing request 290.

Acceptability of routes is determined by any number of supply side carrier availability, performance, and cost/rate parameters, which can include for illustration purposes but not limitation, supply side (a) availability of circuits of the carrier CR, (b) availability of carrier CR bandwidth as a function of CPS and CS limits, (c) availability of any route to the destination NPA NXX of the carrier CR, (d) availability of authorization of the subscriber S and or customer C to utilize an otherwise available carrier CR, carrier CR quality of service parameters, characteristics, and statistics, and (e) carrier route rates that meet demand side subscriber S and customer C cost limits and requirements.

The LCR logic mappers 310 then generate from the scan an LCR matrix 367 of possible routes, wherein the LCR matrix 367 identifies carriers CR that service the route, and respective rates from current, dynamically updated rate decks defining the costs for each such route.

The LCR logic mappers 310 communicate with the LCR DB server cluster 360, and its LCR logic engines and LCR cost/profit analyzers 370, to further filter the one or more acceptable routes in the scan generated LCR matrix 367 to the DN or LRN, filtered by predetermined cost and or profit limits. The cost or profit limits ensure that routes are selected in the generated LCR matrix 367 that meet a minimum cost and or profit limit, which is predetermined and set by the customers C and or subscribers S via the users U or administrators A. The LCR logic mappers 310 may also communicate with any of the other components and devices of systems 100 to filter the acceptable routes according to other preferred carrier CR availability and performance parameters such as those noted above.

While rate cost per unit time for a particular route is useful to ensure minimized costs, it is more optimal to compare the subscriber S and customer C rates to the carrier rates per unit time, to ascertain whether a route is available that meets or exceeds a predetermined profit. Even more preferably, the routes in the LCR matrix 367 are further filtered to identify acceptable routes that meet or exceed a profit of a predetermined amount per unit time, which amount is defined to be one or more of a minimum percentage profit per unit time, a minimum profit amount per unit time, and or a minimum cumulative profit amount for an estimate call duration, and or combinations thereof.

Most preferably, the LCR matrix 367 is further filtered to include only those routes that meet or exceed one or more of a gross profit limit for a subscriber and or a carrier route minimum gross profit. The gross profit is computed to be the difference between one or more of the (a) carrier rate cost for a specific route and the rate charged for forwarding the routing request 290 to the specific route, and (b) the difference between the carrier rate cost for a specific route and the subscriber rate that is charged for forwarding the routing request 290 to the specific route. The minimum gross profit limits can be predetermined and set as noted above for either the subscriber and or the carrier, and combinations thereof.

The capability to select predetermined gross profit limits and or similar cost and profit limits for the demand side customer C and subscriber S has in some circumstances enabled limited optimization and somewhat better utilization of telecommunications infrastructure such as systems 100. However, the capability to select predetermined gross profit limits and related cost and profit limits for the limited bandwidth, CPS and CS limited, supply side carriers CR has demonstrated extraordinary and previously unseen benefits during operation of the telephone network traffic control throttle and systems 100. More specifically, this new capability to select predetermined gross profit and related limits for each carrier route in all carrier rate decks has enabled greatly improved utilization of the limited supply side bandwidth of the carriers CR by only the highest quality traffic T.

The increase in profitability has led to unexpected results in that both carriers CR and customers C and subscribers S are better equipped to reinvest in infrastructure improvements to further increase capacity and capability of telecommunications infrastructure. These improvements have, in turn, led to higher quality of service for customers C and subscribers S because telecommunications infrastructure of supply side carriers CR is more readily available for use when needed, since it is not overwhelmed or consumed with passing lower quality communications traffic.

The supply side CPS-CS-limited bandwidth of carriers CR can now more readily be made available for high quality communications traffic, instead of otherwise being consumed with lower quality traffic that may never complete a call and pay for infrastructure utilization, Additionally, configuring and using the LCR logic mappers 310 and LCR matrices 367 to enable forwarding of only the highest quality routing requests 290 to only those LCR matrix 367 filtered carrier routes, the CPS-CS-limited supply side bandwidth of the available telecommunications infrastructure is protected from inefficient, suboptimal utilization. In other words, forwarding of routing requests 290 can now be controlled by throttling and or blocking routing requests 290 having undesirable or low quality ANIs, LRNs, or cost profiles.

With the filtered route LCR matrices establishing availability of optimal and acceptable carrier routes that meet the various criteria, the outbound routing requests generators 320 are configured to wrap or encapsulate the inbound routing requests 290 with additional forward routing header data that is similar to the routing request headers 292, which enables systems 100 to further forward the routing requests 290 to the outbound traffic forwarders 270 of the outbound edge 250, and externally. Concurrently, the CDR generators 325 are configured to generate call detail records (CDRs) that record the instance of the forwarded routing requests 290, and to monitor termination setup, establishment, and eventual teardown of the established voice, media sessions 298 (FIG. 4). The CDR generators 325 are also configured to communicate the in-process and completed CDRs to the CDR recorders 345 and the trace DB server cluster 420.

An LCR DB server cluster 360 is coupled to and communicates with the LCR proxy server cluster 300 and includes LCR logic engines 365, LCR cost/profit analyzers 370, traffic analyzers 375, and HTTP servers 380. The LCR logic engines 365 include one or more or a plurality of dynamically updated rate decks for each carrier CR that is enabled to receive forwarded traffic from systems 100.

Here, dynamically updated refers to accurately and dynamically updated and continuously maintained rate decks that ensure the most up-to-date and authorized rates are available for use by the systems 100. Each such rate deck includes rates of cost per unit time, such as seconds, decimal minutes, etc., for calls placed to each NPA/NXX destination area and exchange serviced by the carrier CR. The LCR logic engines 365 also include one or more rate decks for each NPA/NXX destination as set by each subscriber S and or customer C that are enabled to utilize the resources of the telephony network traffic throttle and systems 100.

The LCR cost/profit analyzers 370 are configured to calculate the costs of a using a carrier route for a specific DN routed to the NPA/NXX, and to further calculate the profit for a customer C or subscriber S using the carrier route, using in both cases the rate decks applicable to the carrier route. The traffic analyzers 375 are configured to generate cost, profit, and related statistics for each completed routing request 290 using the data generated by the LCR logic engines 365 and the LCR cost/profit analyzers 370, and to store the data for each completed routing request 290 to the DB server cluster 440.

The HTTP servers 380 are configured, among other capabilities, to receive and communicate the rate decks between the LCR logic engines 365 and the customers C, subscribers S, users U, and administrators A for maintenance, updates, and other systems requirements. Many additional capabilities and requirements may be understood by those skilled in the field with reference to an exemplary implementation available at sipnavigator-com.

In an additional arrangement, the systems 100 also further incorporate a trace processing server cluster 400, which is in communication with the other components of systems 100. The trace processing server cluster 400 is configured to receive and capture all communications trace traffic for the routing requests 290 being received and forwarded by the systems 100.

The communications trace traffic may include for purposes of example but not limitation, TCP/IP communications details that include source, destination, intermediate hops, timing, and related traffic performance data. In another example, the trace traffic that is recorded may include SIP trace information that includes source, destination, intermediate hops, and related performance and timing data. The trace processing server cluster 400 also includes trace DB query generators 405, packet capture bundlers 410, and DB load balancers 415.

The trace DB query generators 405 are configured to cooperate with other components of systems 100 such as the analyzers and tracers 240, 245, 280, 285 to create, communicate, and capture responses to trace route, nslookup, dig, whois, ping, and other network forensic and diagnostic queries and requests, which enable monitoring, optimization, error correction, and re-routing of telephony network traffic within and external to the telephony network traffic throttle and systems 100.

The packet capture bundlers 410 are configured to cooperate with the generators 405 and also to monitor and continuously collect, bundle into discrete archives that span a limited number of packets and or a limited time period, all network communications traffic including the HTTP, DB, trace, and other internal traffic of systems 100, as well as the external traffic passing through the systems 100.

By continuously capturing and bundling all such traffic, the systems 100 enable detailed and comprehensive forensic analyses of all past and real-time, present communications, so that errors and issues can be examined and corrected quickly, without the time consuming and unreliable need to reconstruct what may have happened previously. In the past, when errors and issues arose during operation, administrators A and users U were required to attempt to guess at and re-create the past conditions that may have resulted in such errors and issues.

This often is impossible in view of the many continuously changing variables of systems 100 during operation. But now, with all historical details of communications traffic being available, the capability to detect, evaluate, and then correct such issues and errors is possible, without the need to attempt to recreate what may have happened.

A trace DB server cluster 420 is also in communication with the trace processing server cluster 400, and the other components of systems 100. A trace DB query indexer 425 and a trace packet bundle archive 430 are incorporated with the trace DB server cluster 420, and communicates DB traffic with the trace proxy server cluster 400. The DB query indexer 425 receives and indexes for autonomous and continuous operation, and or rapid retrieval, the queries generated by the trace DB query generators 405. The trace packet bundle archive 430 stores the generated bundles from the packet capture bundlers 410.

The trace DB server cluster also communicates data via HTTP traffic with the CDR DB server cluster to capture network trace data from recorded CDRs and trace data from other components of the systems 100. For example, network trace data can also include data generated by the CDR analyzers 350, inbound and outbound traffic analyzers 240, 280 and by the inbound and outbound packet tracers 245, 285.

Another configuration of the telephony network traffic throttle and systems 100 includes a replication DB server cluster 440 in communication with the other devices of the systems 100, and configured to replicate the other systems 100 databases using any one of many possible high-speed, real-time database replication traffic and protocols. The replication database (DB) server cluster 440 is preferably configured to instantiate communications with the other systems and databases using a separately signaling, replication DB traffic, or media protocol optimized for DB data communications. For example, database durability and real-time replication can be optimized using snap-shotting or semi-persistent data replication and storage techniques, which can employ data sharding and other optimization and replication best practices, which can replicate operational system data without consuming resources of the operational systems 100.

Many such data and database replications systems are available, and can include for example without limitation, real-time Redis or similarly capable NoSQL database implementations. NoSQL typically refers to Not Only SQL, structured query language, databases that enable various additional querying capabilities beyond legacy SQL queries. Such databases can be configured for high-speed, real-time operation in a virtual machine (VM) clustered configuration wherein the random access memory RAM of the VMs can be clustered to enable Redis databases to be continuously rebalanced in both RAM resident and disk stored variations. In the example of a Redis implementation, many auto balancing options are possible to enable various system performance requirements, which can be optimized and controlled by the load balancers 235, 415 of the systems 100.

This capability enables persistent, continuous, real-time data replication to ensure fail-safe and fail-over data persistence and protection during operation of the systems 100. Coupled to and in communication with the systems 100 is an included web server cluster 450, which is configured to also communicate with users U and administrators A of the systems 100 and its components, and to detect input and generate and communicate output via HTTP traffic channels to one or more input, output, display, and user interface devices 135. The web server cluster 450 is configured to monitor, generate, and communicate various systems 100 operational and control parameters and data via internal presentation, application, and session layer HTTP traffic.

The many components and devices of the systems 100 have been described as distinctly separate, specifically configured components and devices, configured and incorporated into one or more clusters or subsystems of systems 100. However, it is intended that these components and devices in different arrangements of systems 100 are also to be configured to be included in other such clusters and subsystems. Further, it should be apparent to those skilled in the relevant fields of technology, that the devices and components are also susceptible to being configured as combined, multifunctional devices and components wherein one such reconfigured arrangement is configured as two or more of the earlier described devices and components.

For example without limitation, in certain variations of the systems 100, it is desirable to combine or embed the LCR routers 305, the LCR logic mappers 310, and the LCR logic engines 365 as one multifunctional LCR device embedded on one or more of the LCR proxy server cluster(s) 300, the LCR DB server cluster(s) 360, and or another subsystem, and or across multiple other subsystems of the systems 100. A similar alternate configuration is also appropriate for other of the described components and devices of the systems 100.

Similarly, while the telephony network traffic throttle and systems 100 are illustrated to include various proxy servers and server clusters 210, 260, 300, 330, 360, 400, 420, 440, 450, it should be understood that one or more such servers and clusters may be configured as additionally independent servers and clusters, and also as combined servers and clusters using one or more of the contemplated computer systems 110, and related processors 115 and cooperative components and devices. As used here, the term clusters means one or more and or at least one computer systems 110. More specifically, we describe a server or computer cluster to include one or more of loosely or tightly connected or coupled computers in communication with each other, which operate together so that for some configurations, the clustered computers 110 and or processors 115 operate as a single system.

In all configurations, the servers and clusters of systems 100 are arranged to work together as a single system, which enables high-speed, high-volume, high availability of the constituent components and devices of systems 100. When a permanent or intermittent error or failure occurs on one processor 115 or computer system 110 in the servers and server clusters, the capabilities of the server and cluster devices and components are instantly reallocated and the workload is redistributed to another of the computer systems 110 and processors 115 in the servers and clusters.

In another arrangement of the systems 100, and with continued reference to FIGS. 1, 2, 3, 4, and 5, during operation call routing requests 290 are received by the one or more processors 115, which may be incorporated in one or more of the devices of the inbound edge 200 and the LCR proxy server cluster 300. The one or more processors 115 parse the routing requests 290 and generate and communicate source ANIs 296 and destination telephone numbers (DNs, TNs) 294.

The ANIs 296 and DNs 294 are received by one or more of the LCR proxy and LCR DB server clusters 300, 360, which "dip" or make inquiries with the DNs to the LRN NPA lookup or dynamic routing databases 340. One or more of the CDR DB, LCR proxy, and or LCR DB server clusters 330, 300, 360 generate local routing numbers (LRNs) for DNs 294, which may have been ported to a new exchange carrier CR from an original carrier CR. For DNs 294 that have not been ported, the LRNs may be null, or may be identical or similar to the original DNs 294.

In another exemplary adaptation, the systems 100 include a telephony network traffic throttle 100, which has at least one processor 115 that is coupled to a memory 125 and a switch fabric 215. The throttle 100 is configured to receive call routing requests 290 via the switch fabric 215 and to parse and communicate automatic number identifications (ANIs) 296 from the routing requests 290. An ANI limiter 220 is coupled to the at least one processor 115, and is configured to evaluate accumulated ANIs 296 for a predetermined period of time and to identify those call routing requests 290, which have accumulated ANIs 296 exceeding a call attempt limit during the predetermined period of time.

The ANI limiter 220 is also configured to generate one or more ANI timed locks 355 for the identified call routing requests 290, which have ANIs 296 that also meet one or more additional, predetermined ANI criteria. For example, the ANI limiter 220 is configured to generate the one or more ANI timed locks 355 for those ANIs 296 having one or more of (a) an ANI short duration percentage (SDP) above an ANI SDP limit, (b) an ANI answer seizure ratio (ASR) below an ANI ASR limit, and (c) an ANI average call duration (ACD) below an ANI ACD limit, wherein criteria (a), (b), and (c) are some of the one or more additional, predetermined ANI criteria.

The ANI limiter 220 is also configured to generate one or more of the ANI timed locks 355 to have one or more ANIs 296 and associated expiration times. Once the one or more timed locks 355 are generated, the at least one processor 115 is further configured to communicate a service-unavailable reply to routing requests 290 having unexpired ANI timed locks 355, and to forward routing requests 290 having expired ANI timed locks 355 or not having ANI timed locks.

In alternative configurations for a specific host layer protocol, the routing requests 290 are and or may include session initiation protocol (SIP) requests 290. In this variation, the at least one processor 115 is configured communicate a 503 service-unavailable SIP reply to such SIP requests 290 that have unexpired ANI timed locks 355, and to forward SIP requests 290 having expired or not having ANI timed locks 355.

The preceding arrangements of systems 100 also may include at least one least cost router (LCR router) 305 in communication with a dynamic routing database 340, which is configured to receive the forwarded routing requests 290. As with preceding variations, the at least one LCR router 305 dips the dynamic routing database 340 and generates generate an LRN associated with the destination number. One or more LCR logic mappers 310 are coupled to the at least one LCR router 305, and include a plurality of dynamically updated subscriber and carrier rate decks. The dynamically updated rate decks each have a plurality of rates for respective numbering plan areas/local number prefixes (NPAs NXXs).

The LCR logic mappers 310 are configured to: (a) map a destination NPA NXX from the generated LRN, (b) scan the pluralities of rates for each of the subscriber and carrier rate decks of the plurality, using the mapped destination NPA NXX to identify available carriers, and (c) generate with the scan an LCR matrix 367 for the destination NPA NXX including associated subscriber and carrier NPA NXX rates. The LCR router receives the LCR matrix 367 and determines whether one or more acceptable carrier routes exist that enable forwarding of the routing request 290.

The one or more acceptable carrier routes are further filtered to include only those routes that are acceptable for forwarding the routing requests 290, wherein the pluralities of rates in the LCR matrix 367 generate greater than or equal to a minimum limit subscriber and or a minimum limit carrier gross profit per unit of time.

In a variation, the one or more acceptable carrier routes that are acceptable for forwarding the routing requests 290 are filtered, (a) by comparing in real-time with the routing requests 290 the dynamically updated pluralities of subscriber and carrier NPA NXX rates, and (b) to include only those routes wherein the pluralities of rates in the LCR matrix 367 generate greater than or equal to a minimum limits of subscriber and or carrier gross profit amount per unit of time, if used to forward the routing requests 290. As previously described, the LCR logic mapper 310 filtering to include only the acceptable carrier routes, protects the supply side CPS-CS-bandwidth-limited, available routes of the carriers CR so that such limited bandwidth is optimized for utilization by the most preferred routing requests 290 and traffic T, instead of otherwise being inefficiently overwhelmed by lower quality traffic T.

In a different configuration, a telephony network traffic throttle and systems 100 include at least one processor 115 that is coupled to a memory 125, which are in communication with a routing database 340. The at least one processor 115 is configured to receive call routing requests 290, and to parse and communicate DNs 294 from the routing requests 290, which are formed as part of a routing request header 292. The at least one processor 115 is also configured to use the DNs 294 to dip the routing database 340 to generate an LRN associated with each DN 294.

An LRN limiter 275 is also coupled and or in communication with to the at least one processor 115, and is configured to evaluate accumulated LRNs for a predetermined period of time. The processor 115 also identifies routing requests 290 having accumulated LRNs exceeding a destination attempt limit during the predetermined period of time. The LRN limiter is also further configured to generate one or more LRN timed locks 385 for the identified routing requests having LRNs that also meet one or more predetermined, additional LRN criteria.

The LRN limiter 275 is configured to generate the one or more LRN timed locks 385 for those LRNs having one or more predetermined, additional criteria of, for purposes of example without limitation, (a) an LRN short duration percentage (SDP) above an LRN SDP limit, (b) an LRN answer seizure ratio (ASR) below an LRN ASR limit, and (c) an LRN average call duration (ACD) below an LRN ACD limit, wherein criteria (a), (b), and (c) are some of the one or more predetermined LRN criteria. The LRN limiter 275 is also configured to generate one or more of the LRN timed locks 385 to have one or more DNs 294, and associated LRNs and expiration times.

As a further example, identified LRNs and DNs 294 may be evaluated by the LRN limiters 275, and or the CDR analyzers 350, against an additional, predetermined criteria, for purposes of example without limitation, to determine if they are associated with routing requests 290 that have an average call duration (ACD) below a certain LRN ACD limit, such as below 6 seconds or more or less.

The LRNs/DNs 294 may also be analyzed to ascertain if they have a short duration percentage (SDP) above an LRN SDP limit, such as 35%. The LRNs may be analyzed to determine if the LRN has an answer seizure ratio (ASR) below an LRN ASR limit, such as below about 15%. The LRN and ANI limits described here and previously may be independent, and or dependent upon one another, and combinations thereof, and may be selected to have other limits and ranges beyond the examples described here.

The at least one processor 115 is also configured to communicate a service-unavailable reply to routing requests 290 having unexpired LRN timed locks 385, and to forward routing requests having expired LRN timed locks 385 or not having LRN timed locks. In alternative adaptations, the routing requests 290 are and or may include session initiation protocol (SIP) requests 290, such those described in routing request header 292. The at least one processor 115 is configured communicate a 503 service-unavailable SIP reply to the SIP requests 290 having unexpired LRN timed locks 385, and to forward SIP requests 290 having expired or not having LRN timed locks.

Additionally, in alternative arrangements, the LRN timed lock 385 may be utilized by other components and devices of systems 100 to forward a limited amount of routing requests 290 to thereby throttle the bandwidth available to forward routing requests 290 having unexpired LRN time locks 385. As with the ANI timed locks 355, the bandwidth may be throttled or constrained to amounts between zero or no forwarding, and higher data rates as may be preferable.

In these variations, one or more of the at least one processors 115 communicate(s) with at least one LCR router 305 that is coupled to a routing database 340. The processors 115 are configured to receive the forwarded routing requests 290 and associated LRNs. The LCR router 305 is coupled to one or more LCR logic mappers 310, which are configured as already described. As explained elsewhere herein, in connection with other configurations of systems 100, the acceptable carrier routes in the generated LCR matrices are filtered to include only those routes for forwarding routing requests 290, wherein the pluralities of rates in the LCR matrix 367 generate greater than or equal to a minimum subscriber and or carrier gross profit amount per unit of time.

For example, the LCR logic mapper 310 filtering by use of the LCR matrix 367 to identify acceptable carrier routes, protects the supply side CPS-CS-bandwidth-limited, available routes of the carriers CR so that such limited bandwidth to include, and in turn forward, only the most desirable routing requests 290 and traffic T. This prevents the limited bandwidth infrastructure of the carriers CR from otherwise being inefficiently overwhelmed by lower quality routing requests 290 and traffic T.

With continued reference to the various figures, and now also to FIGS. 4 and 6, another configuration of systems 100 contemplates a method of throttling telephony network traffic 500. Included in the method 500 are:

Step 505: providing at least one processor 115 having a memory 125 and in communication with an inbound switch fabric 215 and an external network IN.

Step 510: parsing with the processor 115 ANIs 296 from routing requests 290 received from the external network IN, and accumulating and evaluating ANIs 296 for a predetermined period of time.

Step 515: identifying routing requests 290 having accumulated ANIs 296 that exceed a call attempt limit during the predetermined period of time.

Step 520: generating for the identified routing requests, one or more ANI timed locks for those ANIs that also meet one or more predetermined ANI criteria.

Step 525: generating the one or more ANI timed locks, to have one or more ANIs and associated expiration times, and for those ANIs having one or more additional, predetermined criteria of (a) an ANI short duration percentage (SDP) above an ANI SDP limit, (b) an ANI answer seizure ratio (ASR) below an ANI ASR limit, and (c) an ANI average call duration (ACD) below an ANI ACD limit, which are some of the one or more predetermined ANI criteria.

Step 530: communicating a service-unavailable reply to routing requests having unexpired ANI timed locks.

Step 535: forwarding routing requests having expired or not having ANI timed locks.

With reference now also to FIGS. 4 and 7, the method 500 also includes:

Step 540: receiving the forwarded routing requests that also each include a destination number DN 294.

Step 545: generating an LRN by dipping a routing database 340 with the DN 294.

Step 550: mapping a destination numbering plan areas/local number prefixes (NPA NXX) from the LRN.

Step 555: providing LCR logic mappers 310, configured with a plurality of dynamically updated subscriber and carrier rate decks each having a plurality of rates for respective NPAs NXXs.

Step 560: scanning the pluralities of rates for each of the subscriber and carrier rate decks of the plurality using the mapped destination NPA NXX.

Step 565: generating with the scanning an LCR matrix 367 for the destination NPA NXX including carriers and associated NPA NXX rates.

Step 570: determining whether the LCR matrix 367 includes one or more acceptable carrier routes exist that enable forwarding of the routing requests.

Step 575: filtering the acceptable carrier routes is accomplished to include only those routes wherein the pluralities of rates in the LCR matrix 367 generate greater than or equal to a minimum subscriber and or carrier gross profit amount per unit time to protect availability of CPS-CS-limited bandwidth acceptable carrier routes and prevent inefficient utilization.

Step 580: filtering the acceptable carrier routes (a) by comparing in real-time with the routing requests the dynamically updated pluralities of subscriber and carrier NPA NXX rates, and (b) to include only those routes wherein the pluralities of rates in the LCR matrix 367 generate greater than or equal to a minimum subscriber and or carrier gross profit amount per unit time.

In another configuration, a method 600 of throttling telephony network traffic is illustrated in FIGS. 4 and 8, and includes:

Step 605: providing at least one processor having a memory and in communication with an inbound switch fabric and an external network.

Step 610: parsing by the at least one processor, destination numbers (DNs) from routing requests received from the external communications network.

Step 615: generating a local routing number (LRN) associated with each DN by dipping a routing database with the destination numbers.

Step 620: evaluating accumulated LRNs for a predetermined period of time.

Step 625: identifying routing requests having accumulated LRNs that exceed a destination attempt limit during the predetermined period of time.

Step 630: generating for the identified routing requests, one or more LRN timed locks 385 having LRNs that also meet one or more predetermined LRN criteria.

Step 635: generating the one or more LRN timed locks 385, to have one or more DNs and associated LRNs and expiration times, and for those LRNs having one or more of: (a) an LRN short duration percentage (SDP) above an LRN SDP limit, (b) an LRN answer seizure ratio (ASR) below an LRN ASR limit, and (c) an LRN average call duration (ACD) below an LRN ACD limit, which are some of the one or more predetermined LRN criteria. In other variations, the method step 635 is adapted for generating the one or more LRN timed locks 385 to have one or more DNs, and associated LRNs and expiration times.

Step 640: communicating a service-unavailable reply to routing requests having unexpired LRN timed locks 385.

Step 645: forwarding routing requests having expired or not having LRN timed locks.

In some configurations, the method steps 640 and 645 receive routing requests that are session initiation protocol (SIP) requests, and are configured for communicating a 503 service-unavailable SIP reply to SIP requests having unexpired LRN timed locks 385, and then for forwarding SIP requests having expired or not having LRN timed locks.

With reference now also to FIGS. 4 and 9, it can be understood that the method 600 also includes:

Step 650: receiving the forwarded routing requests and associated LRNs.

Step 655: providing one or more LCR logic mappers 310, configured with a plurality of dynamically updated subscriber and carrier rate decks each having a plurality of rates for respective numbering plan areas/local number prefixes (NPAs NXXs);

Step 660: mapping a destination NPA NXX from the LRN.

Step 665: scanning the pluralities of rates for each of the subscriber and carrier rate decks of the plurality using the mapped destination NPA NXX;

Step 670: generating with the scanning an LCR matrix 367 for the destination NPA NXX including carriers and associated NPA NXX rates.

Step 675: determining whether the LCR matrix 367 includes one or more acceptable carrier routes that enable forwarding of the routing requests.

Step 680: filtering the acceptable carrier routes to include only those routes in the LCR matrix 367 wherein the pluralities of rates in the LCR matrix generate greater than or equal to one or more of a minimum carrier and a minimum subscriber gross profit amount per unit time.

Step 685: filtering the acceptable carrier routes (a) by comparing in real-time with the routing requests the dynamically updated pluralities of subscriber and carrier NPA NXX rates, and (b) to include only those routes wherein the pluralities of rates in the LCR matrix 367 generate greater than or equal to one or more of a minimum carrier and a minimum subscriber gross profit amount per unit time. As noted elsewhere herein, Steps 680 and or 685 enable the systems 100 to protect availability of CPS-CS-limited-bandwidth acceptable carrier routes and prevent inefficient utilization by low quality traffic and routing requests 290.

With continued reference to the preceding figures, and with attention invited again FIG. 4, the telephony traffic network throttle and systems 100 and methods 500, 600 can be further described in an operational example. For purposes of illustration but not for limitation, a SIP and or HTTP host layer traffic session schematic is described in part, overlaid upon a logical and functional arrangement of portions of systems 100, and included parts of the methods 500, 600. During operation, the systems 100 receive at the inbound edge 200, inbound traffic T that includes a routing request 290.

In the human readable SIP or HTTP messaging context, the routing request 290 includes a SIP invite, similar to that described in the routing request header 292 of FIG. 3. The routing request 290 is received and inspected to ascertain whether it is from a source CL, S, C, that is authorized ("IP Auth?, FIG. 4) to utilize the systems 100. If the request 290 is not, an HTTP or SIP "403 Forbidden" reply may be sent, or the request 290 may be ignored. If utilization is authorized, then a reply "100 trying" may be sent indicating that the request 290 is being processed.

To ensure that the resources of system 100 are protected from less than desirable traffic, the routing request 290 is parsed for an ANI 296 and DN 294 (the DN 294 being dipped to generate an LRN) to ascertain whether it is from a source CL, C, S, that has been identified by either an ANI or LRN timed lock 355, 385. If so, then the routing request 290 may be subject to throttling of available bandwidth on the systems 100. Alternatively, the routing request 290 may be ignored if no bandwidth is to be allocated while the ANI, LRN timed lock 355, 385 remains unexpired.

If any ANI, LRN timed lock 355, 385 is expired or does not exist, then the routing request 290 is then evaluated, see FIG. 4 "ANI/LRN >Limit?", to determine if the ANI and or LRN have accumulated during a look back period of time beyond a predetermined ANI call attempt limit and or a predetermined LRN destination attempt limit.

For example, the ANI limiters 220 and the LRN limiters 275 may be configured to identify routing requests 290 for further evaluation, if more than 100 call or destination attempts have been made during the last 30 or 60 minutes, or any other desired time period or attempt limit. In this way, less than optimal network traffic T and routing requests 290 can be throttled to prevent inefficient utilization of systems 100.

If the call and or destination attempts exceed the predetermined limits, then the routing request 290 is further inspected whereby the ANIs and DNs previously accumulated are examined in more detail. The additional examination depicted in FIG. as "Criteria >Lim?" determines whether the identified ANIs and LRNs meet limits (ACD, ASR, SDP, etc.) of additional, predetermined criteria as previously described.

If the criteria limits are exceeded, then the ANI and or LRN timed locks 355, 385 are generated to throttle and or ignore routing requests 290 having the offending ANIs and or DNs/LRNs. By identifying and quickly throttling such routing requests at the inbound edge 200, the resources of systems 100 are conserved for desired network traffic T, which ensures efficient and optimal utilization. More specifically, the availability of resources of the systems 100 is protected from unwanted utilization. These protections are especially beneficial to operation of systems 100 when utilizing the CPS-CS-limited bandwidth of available, acceptable carrier routes.

Absent time locks 355, 385 and exceeded limits, the routing requests 290 shown in FIG. 4, are then forwarded internally for destination mapping, and LCR processing (310) to generate an LCR matrix 367 with the logic engines 365 to identify available routes R1, R2, through Rn (FIG. 4), and to determine if one or more acceptable routes exist for forwarding the routing request 290.

With continued reference to the preceding figures and now also to FIGS. 10, 11, and 12, additional arrangements include the telephony network traffic throttle 100 incorporating a rate deck synchronization system 700. The throttle 100 and rate deck synchronization system 700 of FIG. 10 are in communication with rate deck and subscriber repositories 705, 710 and include one or more or at least one computer system 110 (for example, also see FIG. 5), which includes one or more or at least one processor 115 that are coupled to a memory 125, storage 120, 130, and input/output (I/O) devices 135, among other components.

The subscriber repository 710 includes subscriber S technical and partnering data and information, such as IP addresses and port configurations, identification of assigned current, historical, and new rate decks, communications technical details such as assigned bandwidth in terms of allowed calls per second, maximum concurrent call sessions, assigned telecommunications protocols and codecs, permitted classes of service and types of telecommunications traffic, and infrastructure utilization, consumption, and performance data and information, among other data.

A rate deck generator 715 is included that is coupled to and or a component of the throttle 100 and rate deck synchronization system 700, and is configured to generate new rate decks 720 and to store them in the rate deck repository 705. The rate deck generator 715 is configured to generate new rate decks that have local, long-distance, and indeterminate costs for each of any number of NPA/NXX routes, as well as costs that may vary as a function of the class of service that the rate decks will be used to enable.

The rate deck generator 715 is also adapted to duplicate and modify existing rate decks in the rate deck repository 710 and from other sources, to create the new rate decks 720, to establish combination and hybrid rate decks for a variety of possible uses, classes of service, and types of customers, subscribers, and users.

The new rate decks 720 include costs or rates for routing a call using one or more costs per unit time or rates for a number of and/or a plurality of destinations D. For the North American NPA/NXX areas, such rate decks 720 incorporate a plurality of rate costs per unit time 735 for forwarding a call routing requests 290 to respective destination numbering plan areas/local number prefixes 740 (NPAs/NXXs). Typically, the rate decks 720 for North America, among other regions, will include rates or costs for intrastate and interstate routing of calls, as well as rates or costs for indeterminate call routes, for each NPA/NXX 740 destination D. Similar types of rate deck configurations can be generated for international call routing rate decks 720.

The rate deck generator 715 or another component of throttle 100 and system 700 is also configured to generate an effective time 725 when the new rate deck will become effective, and an expiration time 730 when it will become obsolete. The rate deck generator 715 is also adapted to generate an access uniform resource locater (URL) 745 for the new rate deck that enables communication and download of the new rate deck 720 via any of a number of communications protocols, such as HTTP, file transfer protocol FTP, or trivial file transfer protocol TFTP as examples.

A hash generator 750 is incorporated that processes or digests the new rate deck 720 to generate a unique rate deck file security hash 755, which can be any type of desired hash, such as a 32-bit Merkle-Damgård 5 or MD5 hash 755, which will uniquely identify the new rate deck 720. A variety of other similarly effective hashing capabilities are also configured for use by the hash generator 750, and can include security or secure hashes of any bit or byte size that are generated using a variety of secure hash algorithms that can include, for example without limitation, SHA1, SHA2, SHA3, and other secure hashing technologies.

Once a new rate deck 720 is generated, it cannot be changed or corrupted without changing its unique hash as generated by the hash generator 750, which enables detection of the possible corruption or undesirable modifications, undocumented or unexpected changes, and or malicious tampering. Thus, the new rate deck 720 and hash 755 can be communicated and transmitted to others who can verify whether the received rate deck 720 is corrupted or otherwise changed from an original state when the hash 755 was generated.

When the rate deck generator 715 is used, it will often first identify in the subscriber repository 710, subscribers S such as customers C or carriers CR that may have an assigned current rate deck 760 in the rate deck repository 705 that is to be replaced by the new rate deck 720. Although, for new such subscribers S, carriers CR, and customers C, the new rate deck 720 may be the first to be generated, in which case there is not a current deck 760 to be replaced. For new rate deck 720 that are to replace prior current rate decks 760, the rate deck generator 715 is also adapted to modify an expiration time 770 of the assigned current rate deck 760 to antedate the effective time 725 of the new rate deck 720.

In addition, the hash generator 750 is configured to generate a unique subscriber rate deck hash 775 for each identified subscriber S, customer C, and or carrier CR, which is used to enable verifiable communications thereto, which can be authenticated by the sending and receiving entities. The unique subscriber rate deck hash 775 is generated using subscriber S data from the subscriber repository 710, and may include a unique key provided by or created for the subscriber S, among other subscriber specific data.

Preferably, the unique subscriber rate deck hash 775 is embedded into the access URL 745 or another part of the message or communication, which is to be sent or transmitted to the customers C, subscribers S, and or carriers CR. Once a new rate deck 720 and the unique rate deck file hash 755, and the unique subscriber rate deck hash 775 are generated, one or more messages 785 are preferably communicated to the subscribers S or others by electronic mail, text, telephone call audio messaging, voice messaging, or other similar communication media, to alert them of the existence of the new rate deck 720 and the imminent expiration of the current rate deck 760.

More preferably, these alert messages are communicated before, perhaps a week or more before, and or days before, and or hours before expiration. After expiration of the current rate deck 760, additional messages 785 are communicated to notify of expiration, and or suspension or cancellation. Such post-expiration messages 785 may also include re-activation information as well as the access URL 745 to enable download.

To enable update and replacement of the assigned current rate deck 760 with the new rate deck 720, the traffic throttle 100 and rate deck synchronization system 700 also incorporates a rate deck updater 780, which is an integral part of and or a separate component that cooperates with the rate deck generator 715 and the rate deck and subscriber repositories 705, 710.

The rate deck updater 780 is adapted to synchronize the rate decks 720 between the throttle 100 and rate deck synchronization system 700, and those of the customers C, subscribers S, and carriers CR that are enabled to use the system 100, 700. The rate deck updater 780 is configured to generate one or more messages 785 that incorporate at least the embedded access URL and the effective time, which are communicated, by email or otherwise, to the identified subscribers S and or customers C and carriers CR.

Further, in addition to communicating the messages 785 by a push arrangement, the network traffic throttle 100 and rate deck synchronization system 700 also enables a pull configuration wherein the customers C, subscribers S, and carriers CR can reach out and communicate with the throttle 100 and system 700 to access a user account and check for the new rate deck 720, and can then obtain the messages 785 or otherwise access and receive/download the new rate deck 720.

In this way, subscribers S and others can take advantage of an on-demand, data pull or polling capability of the throttle 100 and system 700 without the need to rely on electronic mail and other forms of sometimes less desirable push communications, which can sometimes be spoofed or subject to tampering, despite the use of the unique rate deck file and subscriber hashes 755, 775.

During operation, the generated messages 785 are communicated well in advance of the effective time 725 of the new rate deck 720 and before the modified expiration time 770 of the assigned current rate deck 760 so that there is provided an adequate period of time during which the new rate deck 720 and hash 755 can be downloaded by the affected subscribers S or others, and integrated into their respective telecommunications switches and systems. This ensures that the many prior problems encountered when rates and costs change can be alleviated, so as to prevent routing of unwanted traffic, which in turn improves the efficient and optimal use of collaborating switching systems, such as the network traffic throttle 100 and rate deck synchronization system 700.

The rate deck updater 780 is also configured to receive one or more electronic messages or access requests 790 from the subscribers S and other carriers CR and customers C, which incorporate at least the embedded access URL 745. The embedded access URL 745 was received by the subscribers S or others after being communicated by the throttle 100 and synchronization system 700, and is used by the subscribers S, customers C, and carriers CR to access and retrieve the new rate deck 720 and the associated unique rate deck file hash 755. Upon receipt of the electronic message 790 the rate deck updater 780 evaluates the unique rate deck subscriber hash 775, and thereby authenticates the subscriber S.

In some arrangements, this initial authentication is further augmented by a required log in procedure that challenges the subscriber with another layer of authentication, and requires a user name and password, to enable access. Upon authentication, the rate deck updater 780 or another component of system 700 and throttle 100 communicates the new rate deck 720 and the unique rate deck file hash 755 to the requesting subscriber S or another, and in reply to the received one or more electronic messages or access requests 790.

In further preferable variations of the preceding configurations, the rate deck updater is also configured to create an audit trail, and to analyze, identify, and archive from the electronic request 790, one or more request source identifier data 835. The contemplated plurality of request source identifiers or data 835 include one or more of a requestor or subscriber identifier, which can be the received electronic message or access requests 790 and associated log in user name and password, if used, among other possible information.

The request source identifiers 835 may also be a subscriber or requestor email address, and or a URL access user name and password. Additionally, it is often desirable to include as the request source identifier data 835, one or more source local IP addresses of the requestor or subscriber S, including the intermediate IP addresses that are sometimes available for capture and recording during internet-based communications. Further, the request source identifiers 835 may also include one or more source media access control or MAC addresses, which are also sometimes communicated during the contemplated communications of the electronic messages 790, and new rate decks 720, and associate information.

During the described communications, the rate deck updater 780 is further configured to receive the electronic message or access requests 790 and to evaluate therefrom the unique subscriber rate deck hash 775 to authenticate the identified subscriber S. As elsewhere described, the rate deck updater 780 is configured to communicate in reply to the electronic message 790 an error message if the evaluated unique subscriber rate deck hash 775 does not enable authentication of the identified subscriber or subscribers S. The error message can be another and different generated message 785 that can be communicated and archived to document an authentication problem or issue, and to enable improved troubleshooting.

In addition to the preceding capabilities, the rate deck updater 780 is adapted to generate a new rate deck download confirm 795 upon successful communication of the new rate deck 720 and the unique rate deck file hash 755. The new rate deck download confirm 795 is generated and may preferably also include technical details the describe the download operation, which are documented and collected as the new rate deck 720 and the associated unique rate deck file hash 755 are being communicated to the requestor or subscriber S.

For purposes of illustration without limitation, the technical details included in the new rate deck download confirm 795, may also include any or all of the request source identifiers or data 835, among other information.

During operation of the network traffic throttle 100 and rate deck synchronization system 700, and once the new rate deck 720 has been downloaded, routing requests 290 are received and parsed to capture subscriber or requestor identifiers 805 from the routing requests 290 that are received as network traffic T from the external network such as the internet IN, which traffic T can be HTTP traffic or another similarly capable media stream. The rate deck updater 780 or another component is also adapted to identify in the rate deck repository 705 at least one rate deck 720, 760 that has an expired time 730, 770, and which is associated with the subscriber identifiers 805.

Additionally, the rate deck updater 780 or another component is adapted to detect the download confirm 795 and to generate a service unavailable message 785 in reply to the routing requests 290, if the download confirm 795 is not detected. In addition to the service unavailable message 785, the rate deck updater 780 or another component is configured to generate one or more additional messages that can include for purposes of example, but not limitation, a service suspended and a service canceled message, which messages 785 can also include various information to enable the affected subscribers S, customers C, and or carriers CR to address the service interruption.

However, the routing requests 290 are forwarded if the download confirm 795 is detected, which establishes that the new rate deck 720 is unexpired, currently effective, and has been downloaded, and or that the assigned current rate deck 760 remains effective and unexpired. In this way, the throttle 100 and rate deck synchronization system 700 verifies that the subscribers S, customers C, and carriers CR are always aware of and using the effective and current rate decks 720, 760 so that only correct, current and in effect rate decks 720, 760 and costs and rates are used to accept routing requests 290, and to pass and forward route and pass traffic T.

For illustration purposes, those with skill in the technical field should understand, that these capabilities of systems 100, 700 further ensure that only efficiently-costed call routing requests are accepted, for forwarding traffic that will, in turn, efficiently utilize the infrastructure. Additionally, for purposes of example but not limitation, the throttle 100 and rate deck synchronization system 700 enables traffic to only be forwarded to efficient carrier infrastructure for optimal utilization, instead of being forwarded to inefficient and unexpectedly high-cost carrier infrastructure.

The network traffic throttle 100 and rate deck synchronization system 700 is also modified with other configurations to synchronize rate decks 720, 760 with other systems of the subscribers S, customers C, and carriers CR. For further examples, the rate deck updater 780 may further incorporate a request processor 800 that is a part of or a separate component of the throttle 100 and rate deck synchronization system 700. The request processor 800 is configured to receive from the external network IN an electronic request or access request 790 to retrieve a new rate deck 720 and a subscriber or requestor identifier 805 such as an internet protocol (IP) request address.

As with other arrangements, the request processor 800 is adapted to parse from the electronic request 790 an access uniform resource locater (URL) 745 that is embedded with a unique subscriber rate deck hash 775. The unique subscriber rate deck hash 775 is evaluated to generate at least one of another subscriber identifier 805 (in addition to and or instead of the prior parsed IP address) and a rate deck identifier 810.

The subscriber identifier 805 is a data item that may contain the known or captured IP address of the entity that transmitted the electronic message or request 790, and may also include other data unique identifying information. The rate deck identifier 810 may preferably be the rate deck hash 755 that was originally embedded in the generated access URL 745, which is now sent back to throttle 100 and system 700 in the electronic request message 790. If the rate deck identifier is not the same as hash 755, it may be indicative that data has been corrupted in transit, or that an unauthorized attempt is being made to retrieve the new rate deck 720.

The request processor 800 is also configured to automatically poll the switches, systems, and infrastructure of customers C, subscribers S, and carriers CR to remotely detect whether the correct rate deck 720, 760 is in use thereby. The request processor 800 is also adapted to automatically update the subscriber repository 710 to confirm that the correct rate deck is in use and that an incorrect or expired rate deck is in use, and may further detect whether a current in use rate deck 720, 760 is nearing its expiration date.

The request processor 800 is also configured to automatically push the new rate deck 720, for those customers C, subscribers S, and carriers CR that may have authorized automatic updates. For those automatically updated rate deck customers C and others, the request processor 800 generates additional periodic messages 785 before and after such updates. Either or both the request processor 800 and or the rate deck updater 780 are configured to communicate the generated auto-update messages 785.

An authenticator 815 is also included as a part of or a separate component of the throttle 100 and rate deck synchronization system 700. The authenticator 815 is adapted to monitor rate deck updates and to capture update related data for generating an audit trail that enables confirmation and troubleshooting of rate deck updates.

The authenticator 815 is in communication with and coupled to the request processor 800, and is adapted to generate and archive, among other data and capabilities, a request start time 820 that captures the time when the electronic request or access request 790 is received. The authenticator 815 is also configured to query the subscriber and rate deck 705, 710 repositories with one or more of the subscriber and rate deck identifiers 805, 810, and to use these data to identify at least one new rate deck 720 in the rate deck repository 710.

The request processor 800 is also adapted to communicate the new rate deck 720 and a unique rate deck file hash 755 in reply to the electronic request 790. The authenticator 815 is further configured to generate and archive a request stop time 825 that identifies the time when the request of the electronic message 790 to communicate the new rate deck 720 has been completed.

A request status message 830 is also generated by the request processor 800 or another component when the new rate deck and generated rate deck file hash have been communicated or when an attempt has been that might not have been successful. The status message 830 will include the technical details, such as identifiers 805, request source identifier data 835, which are monitored, recorded, and captured as the communications are being processed, and will identify those technical details of time, bandwidth, amount of data transmitted, source and destination IP addresses, server host data and names, errors encountered, and responses received from the requestor S, C, CR, indicating success and failure.

The request processor 800 is also further configured in other variations of the preceding configurations to communicate in reply to the electronic access request 790, among other data and information, the request start and stop times 820, 825, and the status message 830, as well as at least one of the request source identifier data 835. In other preferable adaptations, the request processor 800 is also adapted to identify from the electronic access request 790 one or more request source identifier data 835, which include one or more of the described requestor identifier 805, or any of the other elsewhere herein described data and information.

The authenticator 815 is also configured to archive the identified one or more request source identifier data 835 as with other arrangements. Much like other components, the request processor 800 is modified to also communicate in reply to the electronic request 790 an error message if the evaluated embedded unique subscriber rate deck hash 775 does not enable identification of one or more of a corresponding subscriber S and rate deck 720, 760.

Similar to other described components, the authenticator is further configured to archive the error message reply 785 and the evaluated unique embedded subscriber rate deck hash 775 that is received with the electronic request 790. So too will the authenticator 815 generate a download confirm 795 if the new rate deck 720 and the unique rate deck file hash 755 are successfully communicated in response to the electronic messages or access requests 790.

In these described configurations of the throttle 100 and rate deck synchronization system 700, the authenticator 815 uses subscriber identifiers 805 parsed from inbound routing requests 290, to search for, identify, and detect the associated new rate deck download confirm 795 in the subscriber repository, or in the location that stores the download confirm 795. The authenticator 815 is further configured to identify in the rate deck repository 705, at least one rate deck 720 that has an unexpired expiration time 730, and which is also associated with the subscriber identifier 805.

The authenticator 815 thereby forwards or enables another component to forward the routing requests 290 from those subscribers, customers C, and carriers CR having rate decks 720, 760 that are identified as having unexpired expiration times 730, 770. As described with respect to other similarly configured components, the authenticator 815 is also modified to prevent, or enables another component to prevent, forwarding of traffic T and routing requests 290 for those subscribers S, customers C, and carriers CR for which there are expired rate decks 720, 760, and for which there are not new rate deck download confirms 795 present or detected.

More specifically, when the authenticator 815 or another component enabled thereby, does not detect the new rate deck download confirms 795 and identifies in the rate deck repository 705, at least one rate deck 720, 760 that has an expired time, which are associated with the subscriber identifier 805, then a service unavailable message 785 is communicated in reply to the routing requests 290.

With continued reference to the various figures, and now also especially to FIGS. 11 and 12, additional arrangements of the throttle 100 and rate deck synchronization system 700 are described as being directed to methods 850 of throttling telephony network traffic and rate deck generation and synchronization.

Included in the methods 850 are:

Step 855: providing a processor 115 having a memory 125 or other components, in communication with rate deck and subscriber repositories 705, 710.

Step 860: generating by the processor 115 or another component (a) a new rate deck 720 that includes an effective time 725, an expiration time 730, and a plurality of rate costs per unit time 735 for passing a call routing requests 290 to respective destination D numbering plan areas/local number prefixes (NPAs/NXXs) 740, and (b) and an access uniform resource locater (URL) 745 for the new rate deck 720.

Step 865: generating by the processor 115 or another component and storing in the rate deck repository 705 a unique rate deck file hash 755 for the new rate deck 720.

Step 870: identifying by the processor 115 and the subscriber repository 710 or other components, subscribers S having an assigned current rate deck 760 in the rate deck repository 710 to be replaced by the new rate deck 720.

Step 875: modifying an expiration time 770 of the at least one assigned current rate deck 760 to antedate the effective time 725.

Step 880: generating by the at least one processor 115 or another component a unique subscriber rate deck hash 775 for each identified subscriber S, and embedding at least the unique subscriber rate deck hash into the access URL.

Step 885: generating by the at least one processor 115 or another component one or more messages 785 to be periodically communicated before and after the effective time 725 to the identified subscribers S, which messages 785 include at least the embedded access URL 745 and the effective time 725.

Step 890: receiving one or more electronic messages 790 from the identified subscribers S that incorporate at least the embedded access URL 745.

Step 895*a* and 895*b*: evaluating the embedded access URL 745 and parsing the unique rate deck subscriber hash 775 therefrom to authenticate the subscriber S and communicating the new rate deck 720 and the unique rate deck file hash 755 in reply to the received messages 790 if the subscriber is authenticated.

With continuing reference to the preceding figures, and now specifically to FIG. 12, method 850 also includes:

Step 900: identifying and archiving by the processor 115 from the electronic request 790 request, source identifier data 835 that includes a requestor identifier 805, such as a requestor email address, a URL access user name and password, intermediate and source local IP addresses, and media access control MAC addresses.

Step 905*a* and 905*b*: evaluating the unique subscriber rate deck hash 775 to authenticate the identified subscriber S, and communicating in reply to the electronic message 790 an error message 785 if the evaluated unique subscriber rate deck hash 775 does not enable authentication of the identified subscriber S.

Step 910: generating a download confirm 795 if the new rate deck 720 and the unique rate deck file hash 755 are communicated successfully.

Step 915: providing the at least one processor 115 to be in communication with an inbound switch fabric 215 and an external network IN.

Step 920: parsing by the at least one processor 115, subscriber identifiers 805 from routing requests 290 received from the external network IN.

Step 925: detecting a download confirm 795 for the subscriber identifiers 805 and an assigned rate deck 760 having an unexpired time 770.

Step 930: communicating a service unavailable message 785 in reply to the routing requests 290 if the download confirm 795 is not detected.

Step 935: forwarding the routing requests 290 if the download confirm 795 is detected.

Continuing reference to the various figures, and now also especially to FIGS. 13 and 14, the throttle 100 and rate deck synchronization system 700 are depicted in further methods of operation as methods 950 for throttling telephony network traffic and rate deck downloading and synchronization.

Included in the methods 950 are:

Step 955: providing at least one processor 115 having a memory 125 and in communication with rate deck and subscriber repositories 705, 710, and with an inbound switch fabric 215 and an external network IN.

Step 960: receiving an electronic request 790 from the external network IN to retrieve a new rate deck 720, the request including an access URL 745 embedded with a unique subscriber rate deck hash 775, and an internet protocol (IP) address 805.

Step 965: generating and archiving by the at least one processor 115 a request start time 820.

Step 970: evaluating by the at least one processor 115 the embedded unique subscriber rate deck hash 775 to identify a subscriber S.

Step 975: identifying by the at least one processor 115, the identified subscriber S, and the subscriber and rate deck repositories 705, 710 a corresponding new rate deck 720.

Step 980: communicating, if a corresponding new rate deck 720 is identified, the new rate deck 720 and a rate deck file hash 755 in reply to the received electronic request 790.

Step 985: generating and archiving a request stop time 825 and a request status message 830 after the rate deck 720 and unique rate deck file hash 755 have been communicated.

Step 990: communicating the request start and stop times 820, 825 and the status message 830, and at least one request source identifier data 835 in reply to the electronic access request 790.

Step 995: archiving the start and stop access request times 820, 825 and the access status message 830 to an external archive.

With continuing reference to the various and preceding figures, and now specifically also to FIG. 14, method 950 also includes:

Step 1000: identifying from the electronic request 790 one or more request source identifier data 835 that includes one or more requestor identifiers 805 such as a requestor email address, a URL access user name and password, one or more intermediate and source local IP addresses, and at least one source media access control MAC address.

Step 1005: archiving the identified one or more request source identifier data 835.

Step 1010: communicating in reply to the electronic request 790 an error message 785 if the evaluated embedded unique subscriber rate deck hash 775 does not enable identification of one or more of a corresponding subscriber S and rate deck 720.

Step 1015: generating a download confirm 795 if the new rate deck 720 and the unique rate deck file hash 755 are communicated successfully.

Step 1020: parsing by the at least one processor 115, subscriber identifiers 805 from routing requests 290 received from the external network IN.

Step 1025: detecting a download confirm 795 for the subscriber identifiers 805 and an assigned rate deck 720, 760 having an unexpired time 730, 770.

Step 1030: communicating a service unavailable message 785 in reply to the routing requests 290 if the download confirm 795 is not detected.

Step 1035: forwarding the routing requests 290 if the download confirm 795 is detected.

In other aspects of exemplary implementations of the telephony network traffic throttle 100 and traffic throttling methods 500, 600, 850, 950, the throttle and methods include a plurality of computer processors, transient memories and non-transient computer-readable storage media, network subsystems and interfaces, user interfaces and displays, switch fabric, and communications capabilities. These components and subsystems are or may be in part collocated, and are also configured in well-known geographically disparate, cloud-based arrangements that enable optimized and on-demand resource allocation, reliability, resilience, automated and near-instantaneous fail-over, and system-wide durability, using a variety of widely-available information technology architectures and implementations.

This summary of the implementations and configurations of the telephony network traffic throttle and traffic throttling methods is intended to introduce a selection of exemplary implementations, configurations, and arrangements, in a simplified and less technically detailed arrangement, and such are further described in more detail below in the detailed description.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be better understood by those skilled and knowledgeable in the relevant fields of technology, with reference to the following description and drawings.

The above description refers to systems, methods, components, elements, nodes, or features being in "communication" together. As used herein, unless expressly stated otherwise, use of these terms and words must be understood to mean that one system/method/component/element/node/module/feature is directly or indirectly coupled, joined to, and/or communicates with another, either electronically, mechanically, or both and in some similar way that enables cooperative operation.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, time period, or to an exemplary item commercially available in the market as of a specific date and time period.

Instead, these descriptions are intended to be understood to include conventional, traditional, normal, or standard technologies that may be available now and at any time in the future in some improved and modified form. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

What is claimed is:

1. A telephony network traffic throttle and rate deck synchronization system, comprising:
   at least one processor coupled to a memory and in communication with rate deck and subscriber repositories;
   a rate deck generator coupled to the at least one processor and configured to generate (a) a new rate deck that includes an effective time, an expiration time, and a plurality of rate costs per unit time for forwarding call routing requests to respective destination numbering plan areas/local number prefixes (NPAs/NXXs), and (b) and an access uniform resource locater (URL) for the new rate deck;

a hash generator coupled to the at least one processor and configured to generate, and store in at least one of the rate deck and subscriber repositories, a unique rate deck file hash;

the rate deck generator further configured to identify in the subscriber repository, subscribers having at least one assigned current rate deck in the rate deck repository to be replaced by the new rate deck;

the rate deck generator further configured to modify an expiration time of the at least one assigned current rate deck to antedate the effective time; and the hash generator configured to generate a unique subscriber rate deck hash for each identified subscriber, and to embed at least the unique subscriber rate deck hash into the access URL.

2. The telephony network traffic throttle and rate deck synchronization system according to claim 1, further comprising:

a rate deck updater coupled to the at least one processor and in communication with the rate deck generator and the rate deck and subscriber repositories, the rate deck updater configured to generate one or more messages that incorporate at least the embedded access URL and the effective time, which are to be communicated to the identified subscribers.

3. The telephony network traffic throttle and rate deck synchronization system according to claim 2, further comprising:

the rate deck updater is configured to receive one or more electronic messages from the identified subscribers that incorporate at least the embedded access URL; and wherein the rate deck updater is configured to evaluate the unique rate deck subscriber hash to authenticate the subscribers and to communicate the new rate deck and the unique rate deck file hash in reply to the received one or more messages if the subscriber is authenticated.

4. The telephony network traffic throttle and rate deck synchronization system according to claim 3, further comprising:

the rate deck updater is configured to identify and archive from the electronic messages, one or more request source identifier data that includes one or more of a requestor identifier, a requestor email address, a URL access user name and password, one or more intermediate and source local IP addresses, and at least one source media access control MAC address.

5. The telephony network traffic throttle and rate deck synchronization system according to claim 4, further comprising:

the rate deck updater is further configured to evaluate the unique subscriber rate deck hash to authenticate the identified subscribers, and to communicate in reply to the electronic messages an error message if the evaluated unique subscriber rate deck hash does not enable authentication of the identified subscribers.

6. The telephony network traffic throttle and rate deck synchronization system according to claim 3, further comprising:

the rate deck updater is configured to generate a new rate deck download confirm upon successful communication of the new rate deck and the unique rate deck file hash.

7. The telephony network traffic throttle and rate deck synchronization system according to claim 6, further comprising:

the at least one processor configured to receive and parse subscriber identifiers from routing requests received from an external network; and the rate deck updater further configured to: (a) identify in the rate deck repository at least one rate deck having an expired time and being associated with the subscriber identifiers, and (b) generate a service unavailable message in reply to the routing requests, if the new rate deck download confirm is not detected.

8. The telephony network traffic throttle and rate deck synchronization system according to claim 6, further comprising:

the at least one processor configured to receive and parse subscriber identifiers from routing requests received from an external network; and the rate deck updater further configured to: (a) identify in the rate deck repository at least one rate deck having an unexpired time and being associated with the subscriber identifiers, and (b) forward the routing requests if the new rate deck download confirm is detected.

9. A telephony network traffic throttle and rate deck synchronization system, comprising:

at least one processor coupled to a memory and in communication with subscriber and rate deck repositories and with an inbound switch fabric and an external network;

a request processor coupled to the at least one processor and configured to:

(a) receive from the external network an electronic access request to retrieve a new rate deck and an internet protocol (IP) request address, (b) parse from the electronic access request an access uniform resource locater (URL) embedded with a unique subscriber rate deck hash, and (c) evaluate the unique subscriber rate deck hash to generate at least one of a subscriber identifier and a rate deck identifier;

an authenticator coupled to the request processor and configured to (a) generate and archive a request start time, (b) query the subscriber and rate deck repositories with one or more of the subscriber and rate deck identifiers, and (c) identify at least one new rate deck;

wherein the request processor is further configured to communicate, if a subscriber and new rate deck are identified, the new rate deck and a unique rate deck file hash in reply to the electronic access request; and wherein the authenticator is further configured to generate and archive a request stop time and a request status message when the new rate deck and generated rate deck file hash have been communicated.

10. The telephony network traffic throttle and rate deck synchronization system according to claim 9, further comprising:

the request processor further configured to communicate in reply to the electronic access request, the request start and stop times and the request status message, and at least one request source identifier data.

11. The telephony network traffic throttle and rate deck synchronization system according to claim 9, further comprising:

the request processor further configured to identify from the electronic access request, one or more request source identifier data that include one or more of a requestor identifier, a requestor email address, a URL access user name and password, one or more intermediate and source local IP addresses, and at least one source media access control MAC address; and the authenticator further configured to archive the identified one or more request source identifier data.

12. The telephony network traffic throttle and rate deck synchronization system according to claim 9, further comprising:
the request processor further configured to communicate an error message in reply to the electronic access request, if the evaluated embedded unique subscriber rate deck hash does not enable identification of one or more of an identified subscriber and identified new rate deck.

13. The telephony network traffic throttle and rate deck synchronization system according to claim 12, further comprising:
the authenticator further configured to archive the error message and the evaluated embedded unique subscriber rate deck hash.

14. The telephony network traffic throttle and rate deck synchronization system according to claim 9, further comprising:
the authenticator further configured to generate a download confirm if the new rate deck and the unique rate deck file hash are communicated successfully.

15. The telephony network traffic throttle and rate deck synchronization system according to claim 14, further comprising:
the at least one processor further configured to parse the subscriber identifiers from routing requests received from the external network;
wherein the authenticator detects the new rate deck download confirm and identifies in the rate deck repository, at least one rate deck having an unexpired time and being associated with the subscriber identifier; and
wherein the at least one processor forwards the routing requests if rate decks are identified as having unexpired times and the new rate deck download confirm is detected.

16. The telephony network traffic throttle and rate deck synchronization system according to claim 14, further comprising:
the at least one processor further configured to parse the subscriber identifiers from routing requests received from an external network;
wherein the authenticator does not detect the new rate deck download confirm and identifies in the rate deck repository, at least one rate deck having an expired time and being associated with the subscriber identifier; and
wherein the at least one processor communicates a service unavailable message in reply to the routing requests.

17. A method of optimizing utilization of telephony traffic networks and synchronizing call routing rate decks, comprising:
providing at least one processor having a memory and in communication with rate deck and subscriber repositories;
generating by the at least one processor (a) a new rate deck that includes an effective time, an expiration time, and a plurality of rate costs per unit time for passing call routing requests to respective destination numbering plan areas/local number prefixes (NPAs/NXXs), and (b) and an access uniform resource locater (URL) for the new rate deck;
generating by the at least one processor and storing in the rate deck repository a unique rate deck file hash for the new rate deck;
identifying by the at least one processor and the subscriber repository, subscribers having at least one assigned current rate deck in the rate deck repository to be replaced by the new rate deck;
modifying an expiration time of the at least one assigned current rate deck to antedate the effective time; and
generating by the at least one processor a unique subscriber rate deck hash for each identified subscriber, and embedding at least the unique subscriber rate deck hash into the access URL.

18. The method according to claim 17, further comprising:
generating by the at least one processor, one or more messages to be periodically communicated before and after the effective time to the identified subscribers, which messages include at least the embedded access URL and the effective time;
receiving one or more electronic access requests from the identified subscribers that incorporate at least the embedded access URL; and
evaluating the embedded access URL and parsing the unique rate deck subscriber hash therefrom to authenticate the subscribers and communicating the new rate deck and the unique rate deck file hash in reply to the received one or more electronic access requests if the subscribers are authenticated.

19. The method according to claim 18, further comprising:
identifying and archiving by the at least one processor from the electronic access requests, one or more request source identifier data that includes one or more of a requestor identifier, a requestor email address, a URL access user name and password, one or more intermediate and source local IP addresses, and at least one source media access control MAC address.

20. The method according to claim 18, further comprising:
evaluating the unique subscriber rate deck hash to authenticate the identified subscribers, and communicating in reply to the electronic access requests an error message if the evaluated unique subscriber rate deck hash does not enable authentication of the identified subscribers.

21. The method according to claim 18, further comprising:
generating a download confirm if the new rate deck and the unique rate deck file hash are communicated successfully.

22. The method according to claim 21, further comprising:
providing the at least one processor to be in communication with an inbound switch fabric and an external network;
parsing by the at least one processor, subscriber identifiers from routing requests received from the external network;
detecting a download confirm for the subscriber identifiers; and
communicating a service unavailable message in reply to the routing requests if the download confirm is not detected.

23. The method according to claim 21, further comprising:
providing the at least one processor to be in communication with an inbound switch fabric and an external network;
parsing by the at least one processor, subscriber identifiers from routing requests received from the external network;
detecting a download confirm for the subscriber identifiers and an assigned rate deck having an unexpired time; and
forwarding the routing requests if the download confirm is detected.

24. A method of optimizing utilization of telephony networks and synchronizing call routing rate decks, comprising:
providing at least one processor having a memory and in communication with rate deck and subscriber repositories, and with an inbound switch fabric and an external network;

receiving electronic access requests from the external network to retrieve a new rate deck, the requests including an access URL embedded with a unique subscriber rate deck hash, and an internet protocol (IP) address;

generating and archiving by the at least one processor a request start time;

evaluating by the at least one processor the embedded unique subscriber rate deck hash to identify a subscriber;

identifying by the at least one processor and the identified subscriber, and the subscriber and rate deck repositories, an identified new rate deck;

communicating, if the corresponding new rate deck is identified, the new rate deck and a rate deck file hash in reply to the received electronic access requests; and generating and archiving a request stop time and a request status message after the rate deck and unique rate deck file hash have been communicated.

25. The method according to claim 24, further comprising:

communicating the request start and stop times and the status message, and at least one request source identifier data in reply to the electronic access requests; and archiving the start and stop request times and the request status message to an external archive.

26. The method according to claim 24, further comprising:

identifying from the electronic access requests, one or more request source identifier data that includes one or more requestor identifiers that include one or more of a requestor email address, a URL access user name and password, one or more intermediate and source local IP addresses, and at least one source media access control MAC address; and archiving the identified one or more request source identifier data.

27. The method according to claim 24, further comprising:

communicating in reply to the electronic access requests an error message if the evaluated embedded unique subscriber rate deck hash does not enable identification of one or more of an identified subscriber and new rate deck.

28. The method according to claim 24, further comprising:

generating a download confirm if the new rate deck and the unique rate deck file hash are communicated successfully.

29. The method according to claim 28, further comprising:

parsing by the at least one processor, subscriber identifiers from routing requests received from the external network;

detecting a download confirm for the subscriber identifiers; and communicating a service unavailable message in reply to the routing requests if the download confirm is not detected.

30. The method according to claim 28, further comprising:

parsing by the at least one processor, subscriber identifiers from routing requests received from the external network;

detecting a download confirm for the subscriber identifiers and an assigned rate deck having an unexpired time; and forwarding the routing requests if the download confirm is detected.

\* \* \* \* \*